(12) United States Patent
Akella et al.

(10) Patent No.: US 7,512,612 B1
(45) Date of Patent: Mar. 31, 2009

(54) SELECTING AN OPTIMAL PATH THROUGH A RELATIONSHIP GRAPH

(75) Inventors: Prasad N. Akella, Pleasanton, CA (US); Timothy J. Connors, Menlo Park, CA (US); James Kelly, San Francisco, CA (US); Christopher S. Tolles, San Francisco, CA (US)

(73) Assignee: Spoke Software, San Mateo, CA (US)

( * ) Notice: Subject to any disclaimer, the term of this patent is extended or adjusted under 35 U.S.C. 154(b) by 393 days.

(21) Appl. No.: 10/322,387

(22) Filed: Dec. 13, 2002

Related U.S. Application Data

(60) Provisional application No. 60/401,840, filed on Aug. 8, 2002.

(51) Int. Cl.
*G06F 17/30* (2006.01)

(52) U.S. Cl. .................... 707/101; 707/3; 707/6
(58) Field of Classification Search .................. 707/3, 707/6, 9, 10, 100–102
See application file for complete search history.

(56) References Cited

U.S. PATENT DOCUMENTS

| | | | |
|---|---|---|---|
| 5,276,789 A | 1/1994 | Besaw et al. | |
| 5,402,474 A | 3/1995 | Miller et al. | |
| 5,745,113 A | 4/1998 | Jordan et al. | |
| 5,752,253 A | 5/1998 | Geymond et al. | |
| 5,754,543 A | 5/1998 | Seid | |
| 5,829,003 A | 10/1998 | Okura et al. | |
| 5,835,085 A | 11/1998 | Eick et al. | |
| 5,892,909 A | 4/1999 | Grasso et al. | |
| 6,040,834 A | 3/2000 | Jain et al. | |
| 6,061,736 A | 5/2000 | Rochberger et al. | |
| 6,073,138 A * | 6/2000 | de I'Etraz et al. | 707/104.1 |
| 6,175,831 B1 | 1/2001 | Weinreich et al. | 707/10 |
| 6,240,414 B1 | 5/2001 | Beizer et al. | |
| 6,324,541 B1 * | 11/2001 | de I'Etraz et al. | 707/104.1 |
| 6,338,065 B1 * | 1/2002 | Takahashi et al. | 707/10 |
| 6,339,767 B1 | 1/2002 | Rivette et al. | |
| 6,408,924 B1 | 6/2002 | Anderson et al. | |
| 6,487,604 B1 | 11/2002 | Rochford et al. | |
| 6,509,898 B2 | 1/2003 | Chi et al. | |
| 6,594,673 B1 | 7/2003 | Smith et al. | |
| 6,647,384 B2 * | 11/2003 | Gilmour | 707/5 |

(Continued)

OTHER PUBLICATIONS

Kubota et al., "Exchanging tacit community knowledge by talking-virtualized-egos", Proceedings of the fourth international conference on Autonomous agents, Barcelona, Spain, pp. 285-292, Year of Publication: 2000.*

(Continued)

*Primary Examiner*—Khanh B Pham
(74) *Attorney, Agent, or Firm*—Blakely, Sokoloff, Taylor & Zafman LLP

(57) ABSTRACT

A relationship graph of nodes representing entities and edges representing relationships among the entities is searched to find a match on search criteria, such as an individual or a company. Paths through the relationship graph to the match are identified and a relevance value is associated with each path. A node in each path is specified as a connector for the path. The connectors and relevance values may be displayed to allow a choice of paths. If more than one match is found, a selection may be made by a user. Additionally, any matches may be filtered according to privacy rules.

30 Claims, 12 Drawing Sheets

U.S. PATENT DOCUMENTS

| | | | |
|---|---|---|---|
| 6,671,693 | B1 | 12/2003 | Marpe et al. |
| 6,717,920 | B1 | 4/2004 | Cheng |
| 6,801,200 | B1 | 10/2004 | Prakriya et al. |
| 6,879,985 | B2* | 4/2005 | Deguchi et al. ............ 707/101 |
| 7,024,404 | B1 | 4/2006 | Gerasoulis et al. |
| 7,039,639 | B2* | 5/2006 | Brezin et al. ................. 707/10 |
| 7,047,202 | B2 | 5/2006 | Jaipuria et al. |
| 7,069,308 | B2 | 6/2006 | Abrams et al. |
| 7,099,880 | B2 | 8/2006 | Arning et al. |
| 7,343,365 | B2 | 3/2008 | Farnham et al. |
| 7,362,709 | B1 | 4/2008 | Hui et al. |
| 2001/0053275 | A1 | 12/2001 | Adachi et al. |
| 2001/0054032 | A1 | 12/2001 | Goldman et al. |
| 2002/0012011 | A1 | 1/2002 | Roytman et al. |
| 2002/0059201 | A1 | 5/2002 | Work |
| 2002/0067720 | A1 | 6/2002 | Garcia-Luna-Aceves et al. |
| 2002/0078003 | A1 | 6/2002 | Krysiak et al. |
| 2002/0091667 | A1* | 7/2002 | Jaipuria et al. ................. 707/1 |
| 2002/0099684 | A1 | 7/2002 | Ardoin et al. |
| 2002/0107859 | A1 | 8/2002 | Tsuyuki |
| 2002/0123994 | A1 | 9/2002 | Schabes et al. |
| 2002/0156875 | A1 | 10/2002 | Pabla |
| 2002/0171687 | A1 | 11/2002 | Li et al. |
| 2002/0178161 | A1 | 11/2002 | Brezin et al. |
| 2002/0194256 | A1 | 12/2002 | Needham et al. |
| 2003/0005155 | A1 | 1/2003 | Carbonell et al. |
| 2003/0018719 | A1 | 1/2003 | Ruths et al. |
| 2003/0028668 | A1 | 2/2003 | Garcia-Luna-Aceves et al. |
| 2003/0055892 | A1 | 3/2003 | Huitema et al. |
| 2003/0093482 | A1* | 5/2003 | Watanabe et al. ........... 709/206 |
| 2003/0158855 | A1 | 8/2003 | Farnham et al. |
| 2003/0167324 | A1 | 9/2003 | Farnham et al. |
| 2003/0236784 | A1 | 12/2003 | Tang et al. |
| 2004/0073702 | A1 | 4/2004 | Rong |
| 2004/0111431 | A1 | 6/2004 | Zeller et al. |
| 2004/0111469 | A1 | 6/2004 | Manion et al. |
| 2004/0122803 | A1 | 6/2004 | Dom et al. |
| 2004/0148275 | A1 | 7/2004 | Achiloptas |
| 2004/0170191 | A1 | 9/2004 | Guo et al. |
| 2004/0261030 | A1 | 12/2004 | Nazzal |
| 2005/0021531 | A1 | 1/2005 | Wen et al. |
| 2005/0021750 | A1 | 1/2005 | Abrams |
| 2005/0038533 | A1 | 2/2005 | Farrell et al. |
| 2005/0086211 | A1 | 4/2005 | Mayer |
| 2005/0165866 | A1 | 7/2005 | Bohannon et al. |
| 2005/0283753 | A1 | 12/2005 | Ho et al. |
| 2006/0005118 | A1 | 1/2006 | Golze et al. |
| 2006/0031203 | A1 | 2/2006 | Rosenbaum et al. |
| 2006/0041543 | A1 | 2/2006 | Achiloptas et al. |
| 2006/0085370 | A1 | 4/2006 | Groat et al. |
| 2006/0271526 | A1 | 11/2006 | Charnock et al. |
| 2006/0294085 | A1 | 12/2006 | Rose et al. |
| 2007/0106780 | A1 | 5/2007 | Farnham et al. |
| 2007/0239694 | A1 | 10/2007 | Singh et al. |

OTHER PUBLICATIONS

Foner, Leonard, "Yenta: a multi-agent, referral-based matchmaking system," Proceedings of the first international conference on Autonomous agents, Year of Publication 1997, pp. 301-307.

Kleinberg, Jon, "The small-world phenomenon: an algorithm perspective," Proceedings of the thirty-second annual ACM symposium on Theory of computing, Portland, Oregon, United States, Year of Publication 2000, pp. 163-170.

Adamic, Lada, A., et al., "Search in power-law networks," Physical Review E, vol. 64, 046135, published Sep. 26, 2001, (8 pages).

Johnston, David A., et al., "Social Network and the Implementation of Environment Technology," Nov. 2000, IEEE, vol. 2, Issue 4, pp. 465-4777.

Yao, Beiqing, et al., Absorptive Capacity and Social Network: Internal Ability and External Opportunity for Product Innovation, Nov. 12-15, 2000, IEEE vol. 2, pp. 708-714.

Dijkstra, "A Note on Two Problems in Connexion with Graphs," Numerische Mathematik 1, 1959, pp. 269-271.

Spoke Software Office Action for U.S. Appl. No. 10/320,783 (P001) mailed Jun. 2, 2005.

Spoke Software Office Action for U.S. Appl. No. 10/320,783 (P001) mailed Nov. 23, 2005.

Spoke Software Office Action for U.S. Appl. No. 10/320,783 (P001) mailed May 22, 2006.

Spoke Software Office Action for U.S. Appl. No. 10/320,783 (P001) mailed Oct. 4, 2006.

Spoke Software Office Action for U.S. Appl. No. 10/320,783 (P001) mailed Mar. 20, 2007.

Spoke Software Office Action for U.S. Appl. No. 10/320,783 (P001) mailed Oct. 2, 2007.

Spoke Software Office Action for U.S. Appl. No. 10/320,783 (P001) mailed Jul. 31, 2008.

Spoke Software Office Action for U.S. Appl. No. 10/322,456 (P003) mailed May 19, 2006.

Spoke Software Office Action for U.S. Appl. No. 10/322,456 (P003) mailed Nov. 15, 2006.

Spoke Software Office Action for U.S. Appl. No. 10/322,456 (P003) mailed May 2, 2007.

Spoke Software Office Action for U.S. Appl. No. 10/322,456 (P003) mailed Oct. 17, 2007.

Spoke Software Office Action for U.S. Appl. No. 10/322,456 (P003) mailed Dec. 13, 2007.

Spoke Software Office Action for U.S. Appl. No. 10/322,456 (P003) mailed Aug. 4, 2008.

Spoke Software Office Action for U.S. Appl. No. 10/320,782 (P004) mailed Jun. 1, 2005.

Spoke Software Office Action for U.S. Appl. No. 10/320,782 (P004) mailed Nov. 25, 2005.

Spoke Software Office Action for U.S. Appl. No. 10/320,782 (P004) mailed May 22, 2006.

Spoke Software Office Action for U.S. Appl. No. 10/320,782 (P004) mailed Oct. 4, 2006.

Spoke Software Office Action for U.S. Appl. No. 10/320,782 (P004) mailed Mar. 20, 2007.

Spoke Software Office Action for U.S. Appl. No. 10/320,782 (P004) mailed Oct. 2, 2007.

Spoke Software Office Action for U.S. Appl. No. 10/438,160 (P005X) mailed Jun. 13, 2006.

Spoke Software Office Action for U.S. Appl. No. 10/438,160 (P005X) mailed Dec. 20, 2006.

Spoke Software Office Action for U.S. Appl. No. 10/438,160 (P005X) mailed Jun. 14, 2007.

Spoke Software Office Action for U.S. Appl. No. 10/438,160 (P005X) mailed Dec. 12, 2007.

Spoke Software Office Action for U.S. Appl. No. 10/438,160 (P005X) mailed Jun. 9, 2008.

Spoke Software Office Action for U.S. Appl. No. 10/915,675 (P007X) mailed Feb. 20, 2008.

Spoke Software Office Action for U.S. Appl. No. 10/915,675 (P007X) mailed Jun. 28, 2007.

Spoke Software Office Action for U.S. Appl. No. 10/914,857 (P008) mailed Oct. 5, 2006.

Spoke Software Office Action for U.S. Appl. No. 10/914,857 (P008) mailed Apr. 18, 2007.

Spoke Software Office Action for U.S. Appl. No. 10/914,857 (P008) mailed Aug. 8, 2007.

Spoke Software Notice of Allowance for U.S. Appl. No. 10/914,857 (P008) mailed Dec. 13, 2007.

Spoke Software Office Action for U.S. Appl. No. 10/914,858 (P009) mailed Apr. 10, 2008.

Spoke Software Office Action for U.S. Appl. No. 10/915,593 (P010X) mailed Jan. 26, 2007.

Spoke Software Office Action for U.S. Appl. No. 10/915,593 (P010X) mailed Jun. 8, 2007.

Spoke Software Office Action for U.S. Appl. No. 10/915,593 (P010X) mailed Oct. 15, 2007.

Spoke Software Office Action for U.S. Appl. No. 10/915,593 (P010X) mailed Mar. 25, 2008.
Spoke Software Office Action for U.S. Appl. No. 10/914,859 (P011X) mailed May 30, 2008.
Spoke Software Office Action for U.S. Appl. No. 10/928,234 (P016X) mailed Sep. 18, 2007.
Spoke Software Office Action for U.S. Appl. No. 10/928,234 (P016X) mailed Apr. 4, 2008.
Spoke Software Office Action for U.S. Appl. No. 10/927,738 (P017X) mailed May 11, 2007.
Spoke Software Office Action for U.S. Appl. No. 10/927,738 (P017X) mailed Jan. 15, 2008.
Spoke Software Office Action for U.S. Appl. No. 10/927,738 (P017X) mailed Jul. 22, 2008.

* cited by examiner

SELECTING AN OPTIMAL PATH THROUGH A RELATIONSHIP GRAPH

RELATED APPLICATIONS

This application claims the benefit of U.S. Provisional Application No. 60/401,840 filed Aug. 6, 2002.

FIELD OF THE INVENTION

This invention relates generally to analysis and graphing of relationships among entities, and more particularly to analysis and graphing of social relationships among people.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2002, Spoke Software, Inc., All Rights Reserved.

BACKGROUND OF THE INVENTION

Currently various computer-based applications manage and track interactions between people in conjunction with, for example, a sales process. Customer Relationship Management (CRM) systems that incorporate sales force automation methodologies typically focus on pipeline management and on monitoring the sales process between known endpoints but the current CRM systems cannot identify a new endpoint or provide a guided process to a new endpoint.

Social Network Theory has evolved to characterize the behavior of "referral networks." Researchers have described mathematically the multiple levels of relationships existing among networks of people, for example, the situation where two friends, Jim and Fred, may see each other every day at the gym (high personal relationship strength) but never discuss business (low professional relationship strength). Further, social network theorists have shown that networks exhibit predictable behaviors at the macro and micro levels. As the networks grow, they tend to preferentially attach to the more connected nodes, with the "rich getting richer".

Bridges between networks (particularly between highly connected nodes) that span enterprises are important for sales prospecting purposes. Studies of connections among these networks demonstrated what might appear to be counter-intuitive: when it comes to finding a job, our "weak social links" are more important than the more cherished, strong, relationships, indicating that groups of tightly coupled friendship circles connect to other groups of tightly coupled friendships via "bridges" that sharply broaden the job search space.

Although Social Network Theory has established that evaluating a person's social network can generate high quality contacts, analysis of social relationship information to identify and quantify referral routes to a desired person or company has not been incorporated into computer-based applications. In particular, the identification of "invisible" referral routes has not been addressed, e.g., Fred went to school with the Vice President of Purchasing at a particular company Jim has as a sales target.

SUMMARY OF THE INVENTION

A relationship graph of nodes representing entities and edges representing relationships among the entities is searched to find a match on search criteria, such as an individual or a company. Paths through the relationship graph to the match are identified and a relevance value is associated with each path. A node in each path is specified as a connector for the path. The connectors and relevance values may be displayed to allow a choice of paths. If more than one match is found, a selection may be made by a user. Additionally, any matches may be filtered according to privacy rules.

The present invention is described in conjunction with systems, clients, servers, methods, and machine-readable media of varying scope. In addition to the aspects of the present invention described in this summary, further aspects of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

An overview of the operation of an embodiment of an entity relationship analysis and mapping system is described with reference to FIG. 1A. The system utilizes social network models to build graphs that represent relationships among entities. For sake of simplicity in description, an entity is generally assumed herein to be an individual, but an entity may also be an organization of people, e.g., a company, or collection of characteristics shared by people, e.g., culture or country. Furthermore, the operations described herein may be requested or invoked by other system services, such as applications and computerized agents, as well as entities.

Figure 1A:
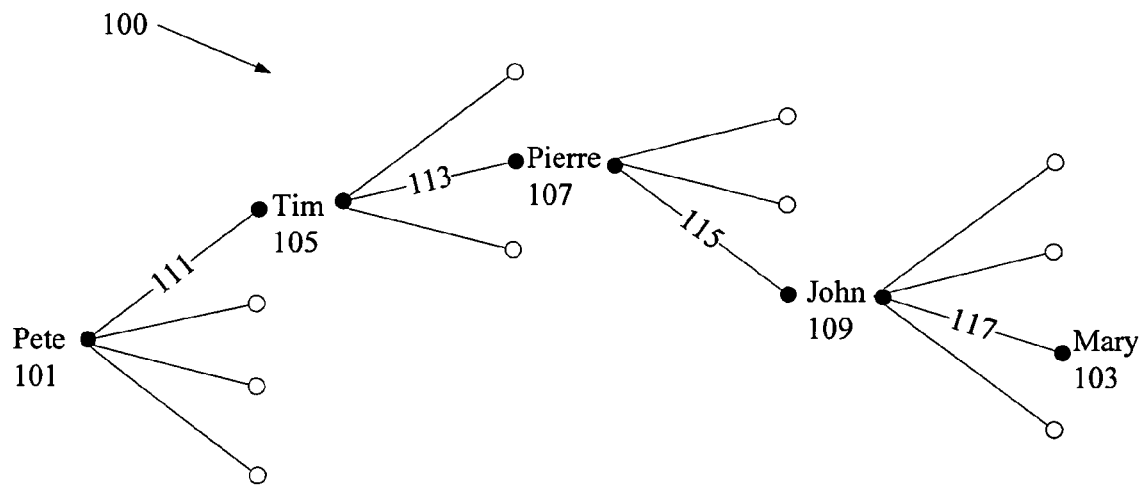
FIG. 1A is a diagram illustrating an operational overview of an embodiment of the invention.

As illustrated in FIG. 1A, relationships among five people form a relationship graph 100 containing nodes 101, 103, 105, 107, 109, representing the people, that are connected by edges 111, 113, 115, 117, representing the relationships among the people. The relationship graph 100 is built from contact data extracted from electronic communication data sources and updated when the source data changes or as a result of processing of the data in the graph. The data source may be an electronic document, such as an address book or an attachment to a message, and/or electronic communication metadata, such as email address headers, instant message logs, phone logs, or the like. It will be appreciated that when the entities represent organization or characteristic collections, additional electronic data sources, such as organization charts, may be used to create the nodes.

Each edge directly connecting a pair of nodes is assigned a "Strength of Relationship" (SOR) weight based on the quality and frequency of contact between the two people (not illustrated). The relationship graph 100, along with the SOR between pairs of nodes, establishes a "Network Strength of Relationship" (NSOR) between every reachable pair of nodes in the social network represented by the graph 100, and an "Aggregate Strength of Relationship" (ASOR) between either subscribers to the system, or groups of subscribers, and targets who are subscribers or non-subscribers known to subscribers ("leaves"), or groups of subscribers and/or leaves. Exemplary formulas to calculate the SOR, NSOR, and ASOR are given further below.

As illustrated, even though Pete and Mary are not directly connected, Pete can "reach" Mary by being referred through the social network represented by the graph 100. Starting with Pete's immediate relationships, the system of the present invention analyzes the relationship graph 100 to dynamically establish a path of intermediate nodes 105, 107, 109 that ends with the node 103, and suggests Tim as Pete's starting contact for his referral request. Pete invokes a workflow function within the system to begin the process of forwarding his referral request to Mary. The system will send a message to Tim, informing him that Pete is requesting a referral to Mary and that Pierre is the next contact in the referral path. If Tim decides to forward the referral request to Pierre, Pierre will receive a similar message indicating that John is the next contact. In an alternate embodiment, any person receiving the referral request may determine that a person different than that originally selected by the system should be the next link in the path. Furthermore, although only one path is illustrated in FIG. 1A, it will be appreciated that the system may rank multiple paths based on various relationship criteria, including SOR value. In one embodiment, the relationship criteria includes common affiliations, such as alma maters, shared between people. It also will be appreciated that additional weights may be calculated for each edge and factored into the path calculation; some exemplary weights are described further below.

Figure 1B:
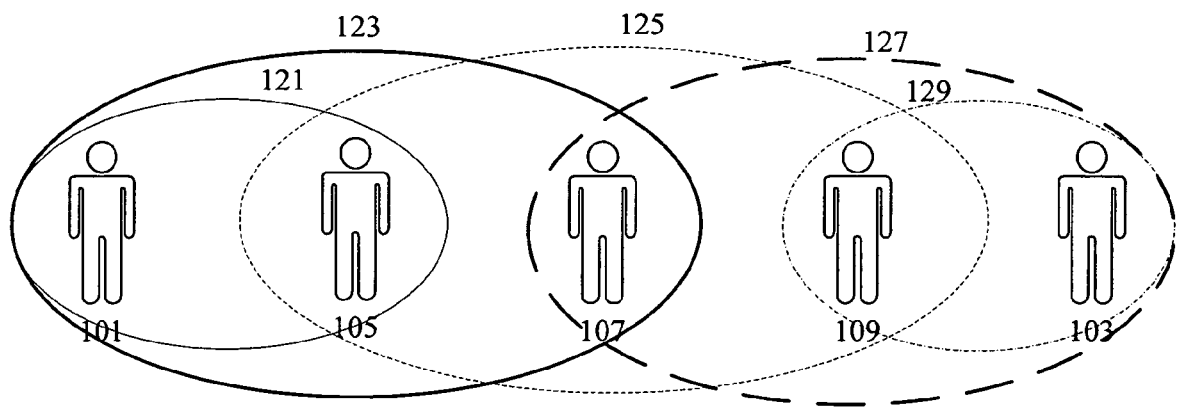
FIG. 1B is a diagram illustrating a privacy feature of the embodiment of FIG. 1A.

Any person in the path may decline to forward the request to the next person, but a privacy protection scheme for the workflow masks the break in the referral chain so that the request originator only knows that the referral request was not successful, not where the chain was broken. The privacy protection scheme is illustrated in FIG. 1B as a series of visibility windows, 121, 123, 125, 127, 129, that block the identities of people in the path outside the immediate scope of the current node who are neither the request originator nor destination. Thus, the visibility window 121 covers Pete 101 and Tim 105, but not Tim's contact Pierre 107. The visibility window 123 allows Tim 105 to see both Pete 101 and Pierre 107, but not Pierre's contact John 109. Similarly, Pierre 107 sees Tim 105 and John 109 through visibility window 125, and John 109 sees Pierre 107 and Mary 103 through visibility window 127. As illustrated, Mary 103 only sees John 109 through visibility window 129. Although not illustrated in FIG. 1B, each visibility window includes the identity of Pete 101 as the originator of the referral and Mary 103 as the destination. In an alternate embodiment, each contact in the chain can elect to hide the identity of the originator of the request. The system may also include a referral proxy function that allows a subscriber to have his/her identity masked when they are the next contact in a path and the previous contact was a particular individual. For example, in a professional services firm, all partners are required to help each other but inter-personal dynamics lead to a situation where one partner may prefer to help another under only certain circumstances.

Assuming someone in the path does decline to forward the request, the system may use that information to recalculate the SOR between the sender of the request and the person that broke the chain. Conversely, if node N passes on the referral it receives from node N−1, the SOR between nodes N−1 and N increases.

Figure 1C:
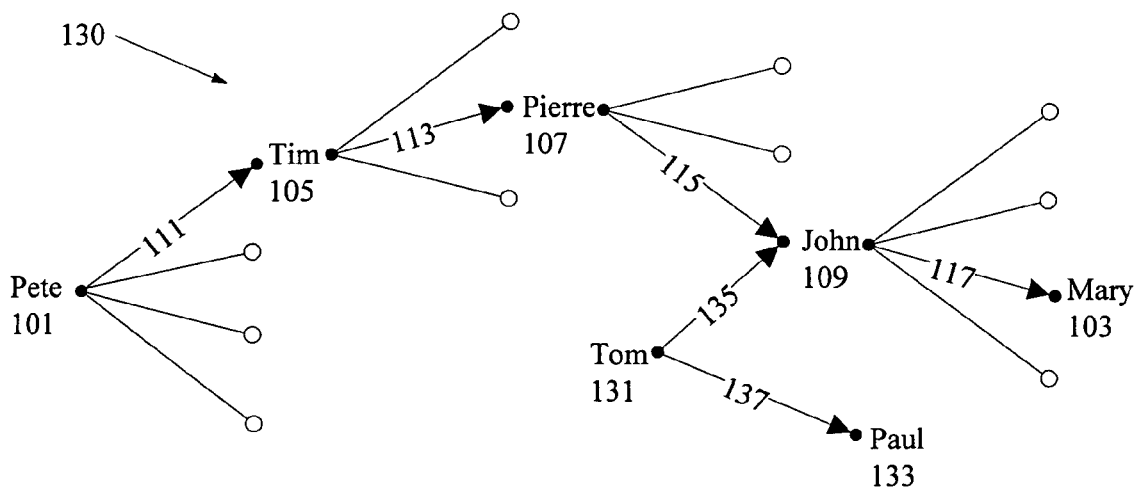
FIG. 1C is a diagram illustration an alternate embodiment of FIG. 1A.

Privacy protection may be facilitated when the relationship graph is a directed graph in which the edge between pairs of nodes can be traversed in only one direction. As illustrated in FIG. 1C, the direction is indicated by an arrow on the edge. Thus, Tom 131 can directly reach John 109 and Paul along edges 135, 137, respectively, and Mary 103 through John 109 along edge 117, but Tom 131 cannot reach Pierre 107, Tim 105 or Pete 101. In contrast, Paul 133 cannot reach anyone other node in the graph 130. The use of a directed graph, such as graph 130, controls the direction the relationship graph can be traversed and thus blocks backward tracking through the graph.

In one embodiment, the system maintains three categories of data about people: public data, private data, and "inferred" data. Public data is information that is generally available, such as on the Internet, or is specifically made available to all subscribers to the system. For example, name, title, and employer fall in the public data category. When a change in public data is extracted from a sufficient number of data sources, the public data is updated if the change is considered "correct" as described further below. Private data is information that every subscriber individually maintains for the other people with which he/she has direct relationships. Thus, A's private data may reflect a change in the mobile telephone number for B while C continues to see only the old number. Inferred data is information developed by the system based on interactions among the subscribers. Thus, in the above example, the system may infer that B has changed jobs based on A's private data. In one embodiment, inferred data is protected with additional security, such as encryption, to safeguard the personal actions of the subscribers.

As previously described, the relationship graph 100 illustrated in FIG. 1A is established based on direct communications among people. However, a new subscriber may not have supplied sufficient information to the system to enable the system to establish a referral path. In an embodiment not illustrated, subscribers may be members of public or private groups, and the system searches through the contacts of the group when establishing a path for a group member. Public groups are open to anyone; joining a private group requires permission from a group manager, typically the creator of the group.

Furthermore, in one embodiment, the system distinguishes among subscribers to the system and those non-subscribers with whom the subscribers communicate to protect the privacy of the non-subscribers. For example, assume non-subscriber A sends email to subscriber B and carbon copies fifteen other people. A has thus exposed the fifteen other people to B and the system adds the fifteen people to B's relationship graph as "shadow" nodes, which it includes in its search when B requests a referral path. Additionally, A is added as a "shadow" subscriber. However, because A is a shadow subscriber, no subscribers other than B can search through A and any workflow that identifies B as an intermediary link to one of the fifteen ends at B. If B decides to forward the referral request, B contacts A outside the system.

While the system has been described in terms of relationships between pairs of nodes, it will be appreciated that nodes may be grouped into sets and that relationships may be established among nodes and sets of nodes in various combinations and processed in a similar fashion to relationships among individual nodes.

Figure 2:
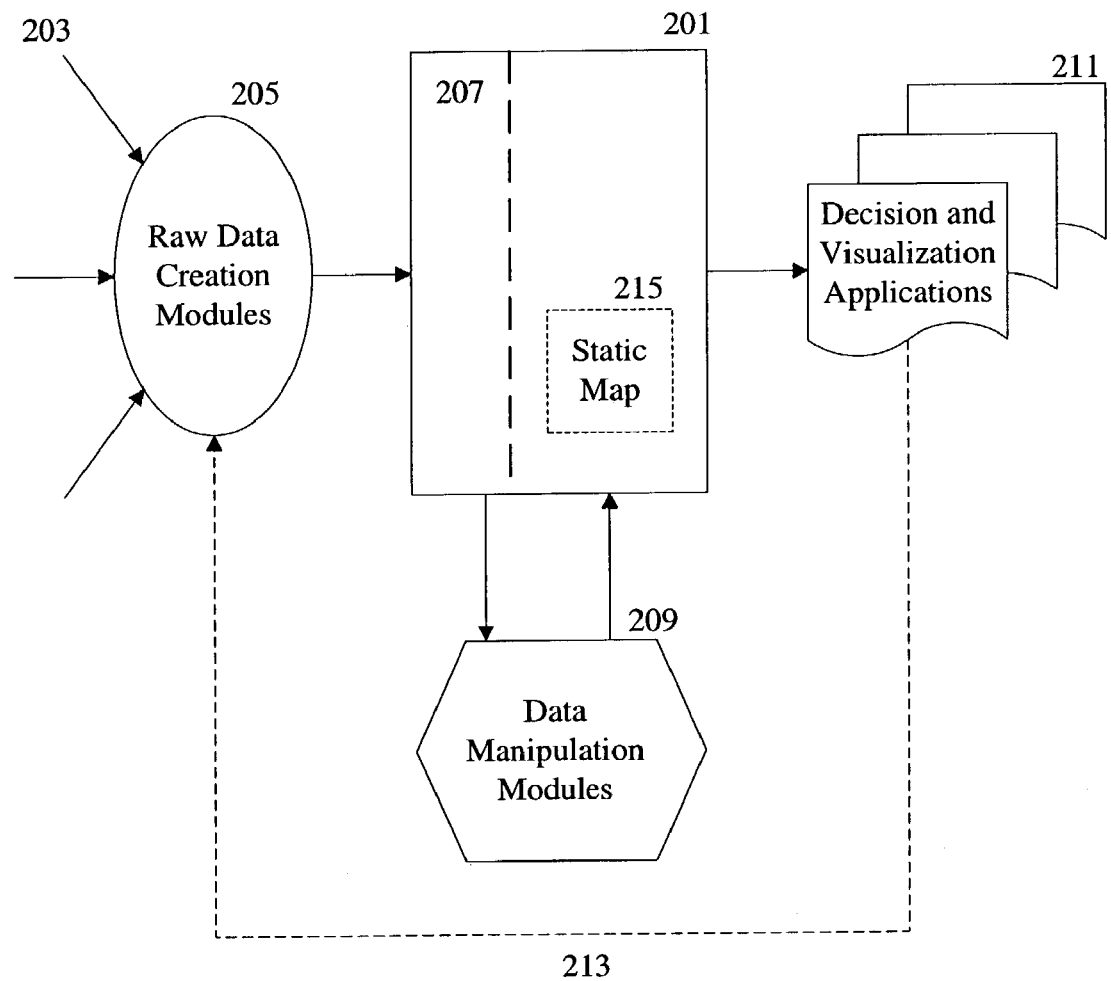
FIG. 2 is a diagram illustrating an overview of data flow and processing modules of an embodiment of the invention.

FIG. 2 illustrates one embodiment of logical data flows and modules that build, maintain, and use a global relationship graph, such as graph 100 in FIG. 1A. Raw data is extracted from data sources 203 by modules 205. The raw data is stored in a local area 207 in a relationship graph data store 201 for subsequent manipulation by modules 209 into a global relationship graph. Instances, referred to herein as "maps," of the global relationship graph may be created to represent all or portions of the global relationship graph and may present the relationship data in different formats. As illustrated in FIG. 2, static map 215 is built from the global relationship graph and used by decision and visualization applications 211, such as, for example, to establish a referral path and perform the workflow function described above. Additional applications 211 are described further below. Results from the applications 211 may be fed back, as illustrated by arrow 213, into the relationship graph data store 201 to update the global relationship graph. Thus, the global relationship graph is dynamic and reflects information "learned" from the operations of applications 211. It will be appreciated that data sources 203 may be any resource that contains relationship information for people or entities that affect the global relationship graph and the applications 211 and is not limited to only those resources described herein.

Figure 3:
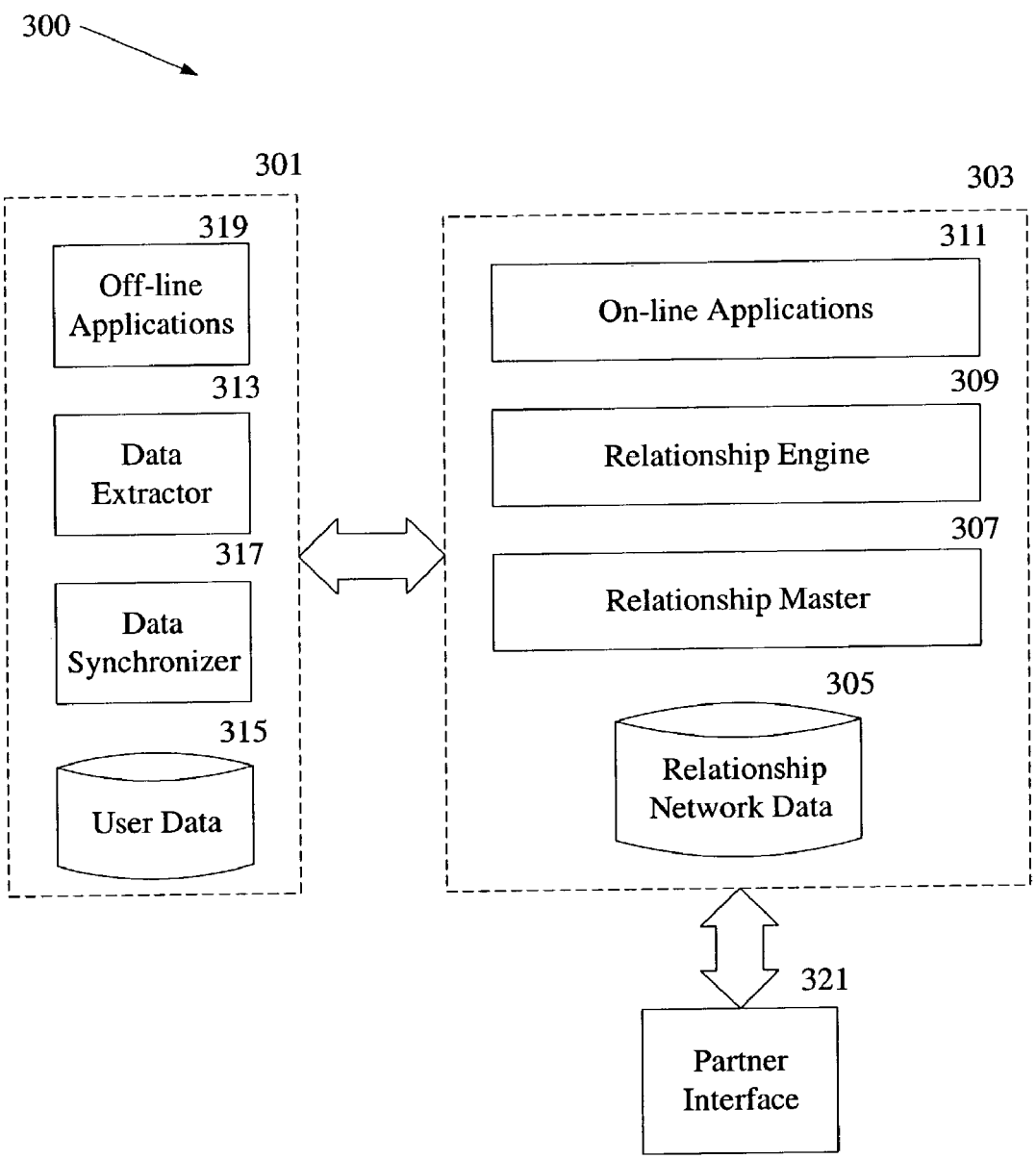
FIG. 3 is a block diagram illustrating a system architecture for an embodiment of the invention.

Turning now to FIG. 3, one embodiment of an architecture for a system 300 that implements the data flows and modules of FIG. 2 is described. As illustrated in FIG. 3, the system 300 includes a client 301 (or clients) for each individual subscriber to the system 300 and a server 303 that manages the global relationship graph. In addition, one or more partner clients 321 may also access the relationship data through various maps created by the server 303. The client 301 contains a data extractor module 313 that extracts raw data from data sources available to the client and inputs the raw data to the server 303. The client 301 also contains a data synchronization module 317 that receives updated relationship data from the server 303, which it stores as user data 315 for access by off-line applications 319. For example, the subscriber may want to search his/her relationship data when the client 301 is not connected to the server 303. In one embodiment, the off-line applications 310 include individual graph builder and searcher modules that build and search client relationship graphs based on the relationship data. One of skill in the art will readily understand that the user data 315 may also include the raw data accessed by the data extractor module 313.

The server 303 includes a relationship engine 309 that refines the raw data received from the data extractor modules 313 on the clients 313 into relationship graph data 305. The configuration of nodes and edges that represent the relationship graph data 305 in the resulting relationship graph is defined by a relationship master 307. The relationship engine 309 also is responsible for processing the relationship map(s) in response to queries submitted by on-line applications 311, such as a request to search for a referral path or to provide workflow functions. In one embodiment, the relationship engine 309 includes an update process, a scoring process, and a reconciliation process to build and maintain the relationship graph, the map(s), and the graph data 305 as described in more detail below. Additional processes may be included in the relationship engine 309 to support various on-line applications 311, the client 301, and the partner client 321. In yet another embodiment, the relationship engine 309 generates a status value for each subscriber based on the strength of his/her relationships and use of the system 300 vis-à-vis a peer group and the entire subscriber base. The status value may be a criterion in the referral path search process. An exemplary formula to generate the status value is given further below.

It will be appreciated that the single data store 305 may represent multiple physical devices holding the relationship network data and that multiple, different graphs may be federated into a single data store, as described further below. Furthermore, not all data received by the system 300 may be stored in data store 305 but some particularly sensitive data may be evaluated and the results stored instead. Alternatively, such data may be encrypted or otherwise hidden in case of security breaches in the system. Relationship data may become stale due to lack of activity by an entity or termination of the subscription to the system. Under some circumstances, such stale data may be retained to allow future updating or because the data is considered historical. In other cases, the stale data is replaced by more correct data as described further below.

As described above, the system 300 is based on social network models and the relationship engine 309 may include a relationship modeling process that aggregates and analyses subscriber and enterprise (system-wide) data to refine the social network models and relationship scoring techniques. The aggregated data is used to create characteristic models at different levels of abstraction that may be subsequently used as default values for a new system. In one embodiment, the aggregated data includes enterprise and vertical characteristic (e.g., industry, culture, country) data. The enterprise characteristic data is an aggregated model of all the subscribers on a specific system 300. This model characterizes the enterprises subscribers based on behavioral averages and can be transported to a new, similar enterprise to enable faster deployment without compromising the underlying data. Extending the enterprise characteristic data to verticals permits further generalization of the models.

In an alternate embodiment, the aggregated data includes subscriber characteristic data that is visible only to the subscriber and is a model of the individual's preferences and characteristics. For example, as the system learns the subscriber's behavior, the SOR formula may be tuned specifically for the subscriber. The subscriber characteristic data may be transported to a different server 303 and thus avoids extensive recreation of the data under such circumstances.

The on-line applications 311 may be broken into two categories: personal productivity applications centered around a single subscriber, and enterprise applications that encompass a more global perspective of the relationship graph. Personal productivity applications analyze the relationships of an individual subscriber and enable expansion of the subscriber's relationships. Additionally, the individual is given the ability to tailor certain aspects of the system to his/her needs. For example, a subscriber may create a "privacy fence" that accepts referral requests from only a certain set of contacts. In one embodiment, the privacy fence may have various levels and the subscriber may employ multiple privacy fences. A subscriber desiring to connect with many people would set the level low, while a well connected subscriber would set it high. The privacy fence permits the subscriber to identify key, trusted, colleagues through whom all referrals have to be channeled. For example, the President of the United States would have all requests sent to him/her channeled through the cabinet members. The configurable privacy fence can be a simple "route all requests thru these five trusted members" or can be a more complex one based on the subscriber's network size and sets which subscribers outside of his/her address book can access the subscriber (e.g., if a requester is more than 4 hops out, the request is denied), how they access the subscriber (e.g., the subscribers designated to filter referral requests), and which of his/her inner circle of contacts are absolutely or relatively hidden from the network.

In an alternate embodiment, the privacy fence is configured with levels of privacy for the subscriber's relationships. A "private" relationship privacy level hides the existence of a relationship from all subscribers, including those within the privacy fence. Relationships marked with a "protected" relationship may be accessed by subscribers within the privacy fence. The default relationship privacy level is "public," which allows access to the relationship by subscribers not within the privacy fence. Thus, the relationship privacy levels control exposure of the relationships of a subscriber to other subscribers.

In yet another embodiment, the privacy fence is configured with a closeness factor that defines how near another subscriber must be to the owner of the fence to search through the owner's network. The closeness factor may be derived from NSOR and/or number of links between the owner and the searcher and may be constrained within pre-defined limits.

Enterprise applications provide connections between desired contact targets and subscribers in the system 300 and analysis of the relationship network represented by the relationship graph. Industry or association applications may be considered a subset of the enterprise applications and facilitate collaboration among individuals from disparate enterprises who share common affiliation goals.

In addition, both the personal productivity and enterprise applications may include graphical tools that enable subscribers to visualize the global relationship graph, or an individual's part of it, as a visual map. Visual clues, such sizes of nodes, thickness and color of the edges, can identify holes in the relationship graphs, show changes in the relationship graphs over time, and illustrate how far an enterprise, or an individual, can "reach" through its existing relationships. Particular embodiments of productivity and enterprise applications are described below in conjunction with FIGS. 6A-C.

Although FIG. 3 illustrates a single server 303, the system 300 may encompass multiple servers to balance the processing load of an enterprise and one or more of the servers may be networked to servers for another enterprise. When enterprise servers are networked together, the relationship graphs for the different enterprises may be unified, allowing searches and workflows that span both enterprises and expanding the reach of each. In order to protect the integrity and confidentiality of the underlying data, in one embodiment, the enterprise graphs are encrypted and unified on a neutral, third-party server so that neither enterprises has direct access to the relationship data of the other.

In yet another embodiment, a search may access multiple relationship graphs based on permissions, such as an access control list. To avoid unnecessary searching, an interface may be constructed for one or more of the relationship graphs that analyzes the search criteria to determine if any of its data matches the search criteria.

Embodiments of methods performed by client 301 and server 303 are now described with reference to flowcharts in FIGS. 4A-B, FIGS. 5A-C and FIGS. 6A-C.

Figures 4A, 4B:
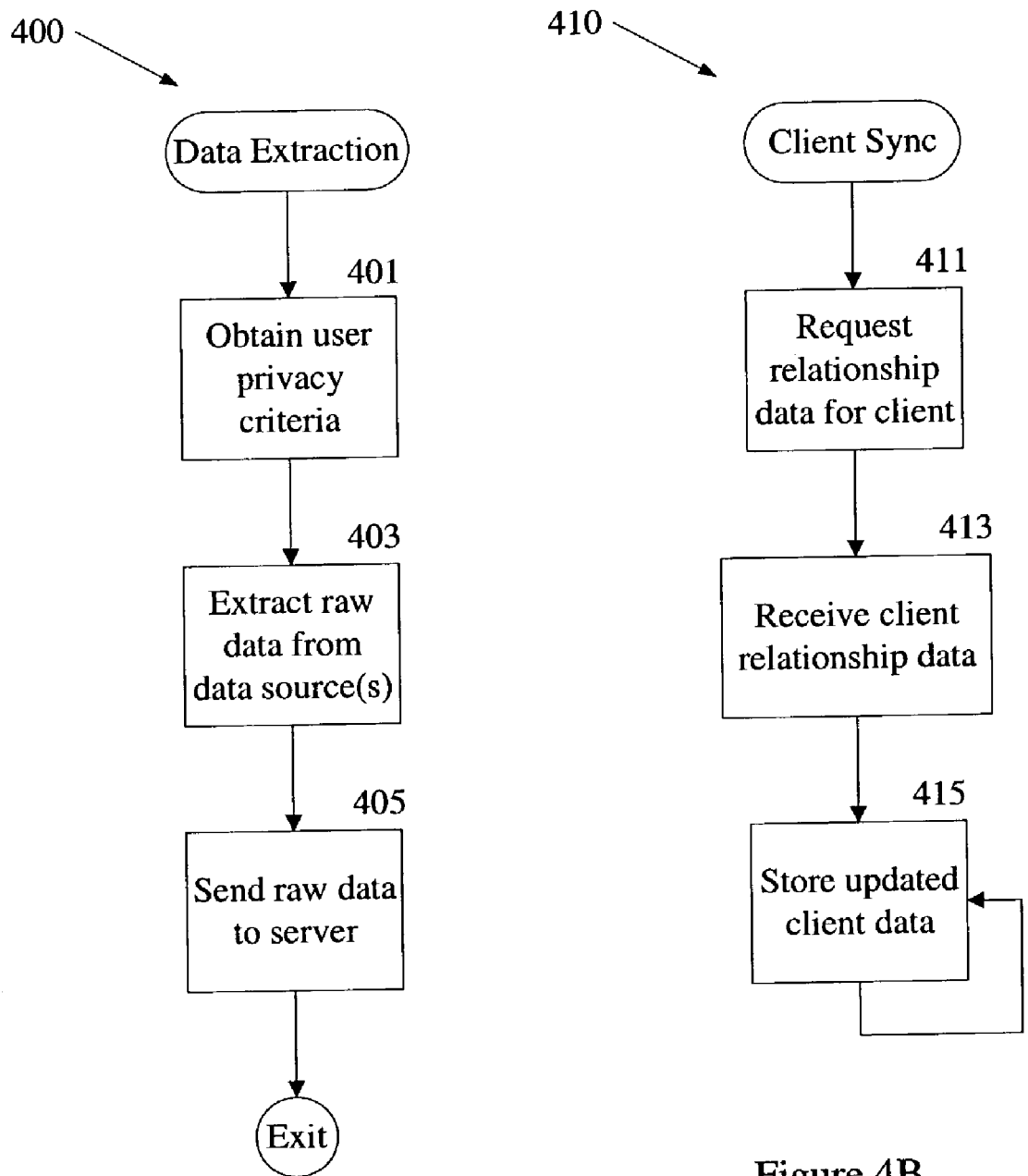
FIGS. 4A-B are flowcharts of methods to be performed by a client according to an embodiment of the invention.

FIGS. 4A and 4B illustrate methods performed by the client in extracting and using relationship data. FIG. 4A illustrates one embodiment of a data extraction method 400, such as performed by the data extractor module 313 of FIG. 3. The data extraction method 400 obtains subscriber privacy criteria (block 401) and extracts raw data from various data sources available to the client (block 403) in accordance with the privacy criteria. The data sources from which the data is extracted may include electronic documents, such as address books provided with Outlook or Lotus Notes email clients, or metadata derived from electronic communication traffic, such as email headers or communication logs. The type of contact information that is extracted may include name, e-mail addresses, telephone numbers, street addresses, and the like. The privacy criteria may prohibit the extraction of information from contacts based on pre-determined categories or logical storage path of the data. In one embodiment, the data extraction method 400 is incorporated into an ActiveX control downloaded from a server to the client. Once the appropriate data is extracted, the method 400 sends the raw data to the server (block 405), where it is processed and used to update the relationship data as described further below in conjunction with FIG. 5C.

FIG. 4B illustrates a client synchronization method 410, such as performed by the data synchronizer module 317 of FIG. 3. Because the amount of relationship date stored on the server is generally too large to be stored on a client and to protect the privacy of data, only a subset of the relationship data is synchronized. In the embodiment shown in FIG. 4B, method 410 initially requests relationship data from the server (block 411). Alternatively, the server may push the initial relationship data to the client without a request being sent. The relationship data received from the server (block 413) is stored on the client (block 415) in user data 315 for subsequent use by off-line applications 319. As illustrated, method 410 receives periodic updates to the relationship data, such when the client logs onto the server, on a timed schedule, or upon the occurrence of a pre-defined event, such as another subscriber publishing data associated with the subscriber of the client, or the joining of a new subscriber that affects the relationships of the subscriber of the client. In one embodiment, the subset of the relationship data is based on a pre-defined number of nodes away from the node representing the user of the client in the static map. In an alternate embodiment, the subset is based on a NSOR threshold for the relationships. In yet another embodiment, the subset is based on both these criteria. Additional criteria for subsets will be readily apparent to one skilled in the art. The client may also receive updates to its contact information from the server at block 415.

A client relationship map is built when an off-line application needs to search the relationship data. In one embodiment, an individual graph builder module on the client creates the client map as described further below in conjunction with FIG. 5B, and an individual graph search module searches the client static map as described further below in conjunction with FIG. 6B. It will be appreciated that the reduced size of the client static map may require modifications to the functions described in FIGS. 5B and 6B but such modification will be readily apparent to one skilled in the art without further description.

Figure 5A:
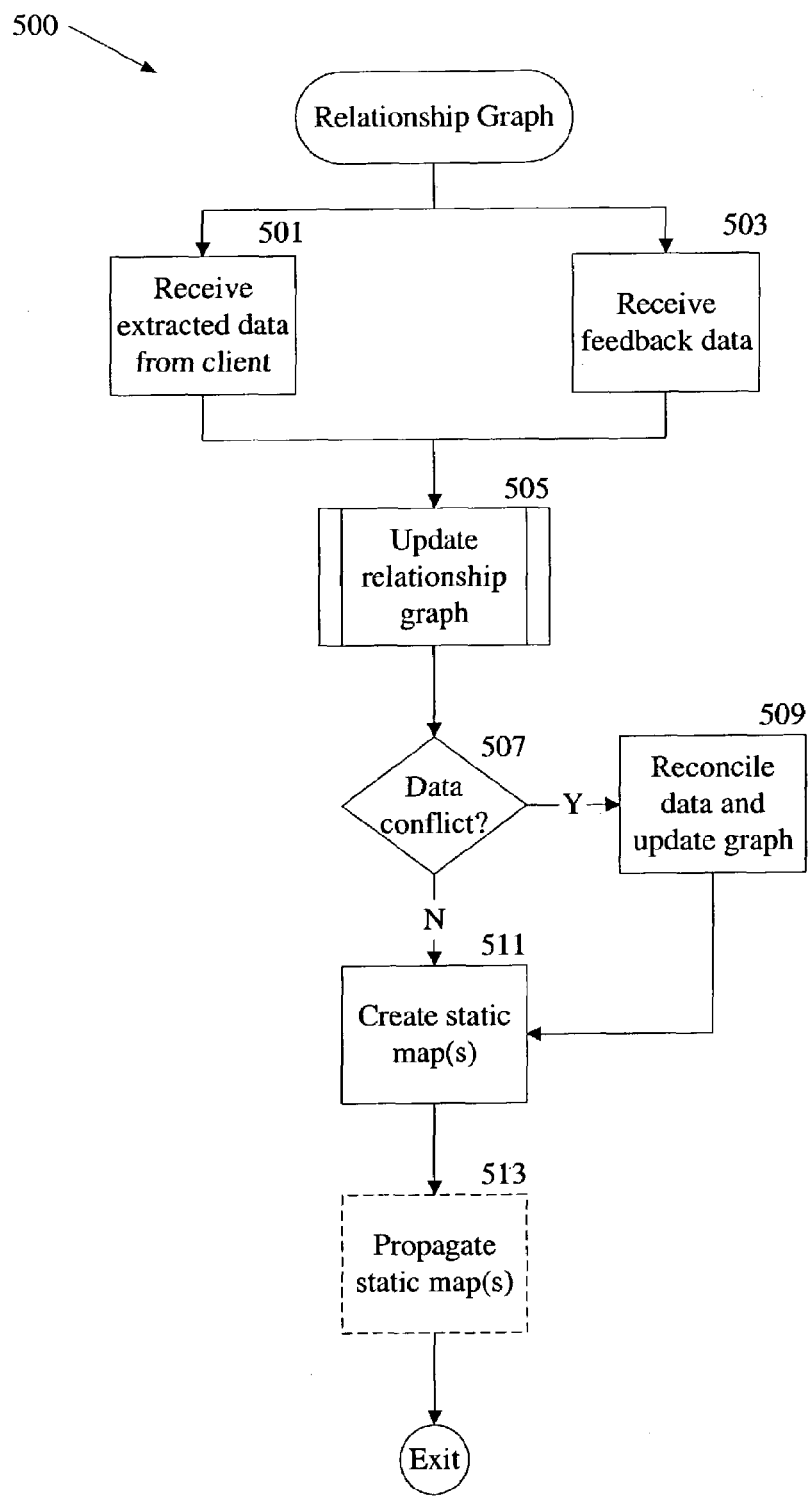
FIGS. 5A-C are flowcharts of methods to be performed by a server according to an embodiment of the invention.

FIG. 5A illustrates a method 500 for building and maintaining a relationship graph, such as might be incorporated in the relationship engine 309 of FIG. 3. The method 500 receives extracted data from a client (block 501) or feedback data 213 from applications 211 in FIG. 2 (block 503). The feedback data 213 may represent a manual update of an entity's data by the entity or by another, or a request by one entity for data on another entity. In the latter case, requests for small pieces of data from multiple entities can be combined into a detailed representation of an entity. If private data is incorporated, it is so marked and its private nature is maintained. The method 500 updates the relationship graph with the new data (block 505), as described in more detail in conjunction with FIGS. 5B and 5C further below.

A contact may have relationships with multiple subscribers in the system and each subscriber may have a different view or "notion" of the contact's information. To preserve privacy, in one embodiment, method 500 creates multiple nodes to represent the notions and links each to the appropriate subscriber node. The method 500 may also create a master node that represents a unified view of the data. In an alternate embodiment, only a master node is created containing all the view of the data and indicators within it specify what data is accessible by which subscriber. If method 500 detects a conflict among data that is accessible by multiple subscribers (block 507) it invokes a reconciliation process to resolve the conflict and update the graph with the "correct" data (block 509). Conflict detection at block 507 may be based on any type of criteria. In one embodiment, the processing at block 507 reviews all nodes having the same email address to determine if any of their data conflicts.

The reconciliation process determines a degree of "correctness" for each version of the conflicting data. Assume there are 100 subscribers in the system that have information for contact A, 75 of whom show the same home address for contact A, with the other 25 subscribers having many different home addresses for A. In one embodiment, the reconciliation process extrapolates that the home address known to the 75 subscribers is likely the correct address based on the percentages. On the other hand, if A has recently moved, only a few people may actually have the new address. Therefore, in another embodiment, the reconciliation process additionally considers how recently the data for A has been updated based on creation and update time stamps associated with the data. In still another embodiment, each field of data is associated with a set of rules that base degree of correction on data attributes. For example, a rule for the home address field may rate a P.O. Box number less "correct" than a street address since the P.O. Box number may be given to less trusted entities. Additionally, the closeness of the relationship between the contact and the entity, measured through the SOR or relationship type, i.e. parent-child, may be a factor. The reconciliation process may update the public data in each node with that determined most correct. Additionally, if a node representing a unified view of the data has been created, at block 509 the reconciliation process updates it with the data determined most correct.

The method 500 creates one or more static maps from the relationship graph (block 511), and optionally propagates the static maps throughout the system if there are additional servers in the system (block 513, shown in phantom). In one embodiment, the relationship data is maintained on a master server and a global static graph is created on the master server that reflects the total relationship graph. The global static map is subsequently pruned, typically optionally, according to pre-determined criteria, such as company affiliation, performance parameters, path usage, path length, and system-discovered data (e.g., inferred data or hidden relationships), to create subset static maps that reflect certain portions of the total relationship graph, or to produce maps with limited detail that may be used in the aggregation process described previously. The global and/or subset static maps may be propagated to particular servers within the system at block 513. In one embodiment, the process represented by block 513 transmits the updated global or subset static graphs to the appropriate server when a queue of requests on the server is empty. It will be appreciated that the propagation may be performed serially on each server or in parallel and that the process at block 513 may incorporate time-out and retry functions to handle situations in which the server(s) are busy. Support for various types of server clusters is also considered as within the scope of the invention.

Figure 5B:
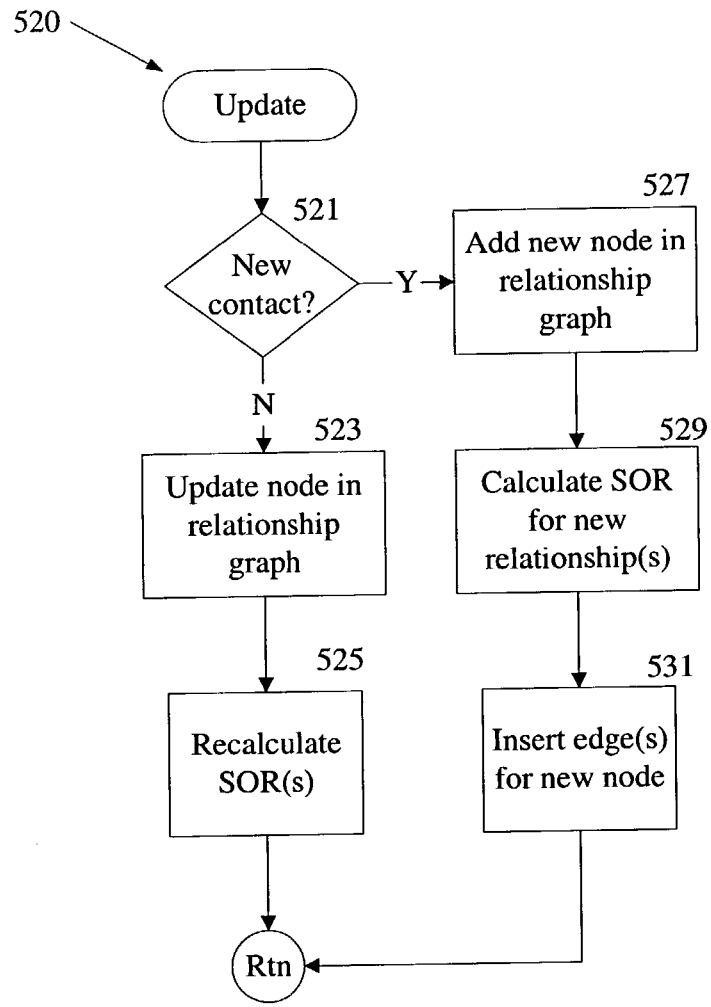

FIG. 5B illustrates one embodiment of an update method 520. If the new data represents an update to an existing contact for an entity (block 521), the method 520 updates the data for the corresponding node (block 523) and recalculates the strength of relationship SOR(s) for the relationships in which the contact participates (block 525) as described next. If the data represents a new contact at block 521, the method 520 adds a new node for the contact (block 527), calculates the SOR(s) for all relationships for the new node (block 529) and creates edges for the relationships for the new node (block 531). It will be appreciated that the new or updated data is stored in the underlying database, such as relationship network data 305 in FIG. 3, in accordance with the data configuration defined by the relationship master 307.

Figure 5C:
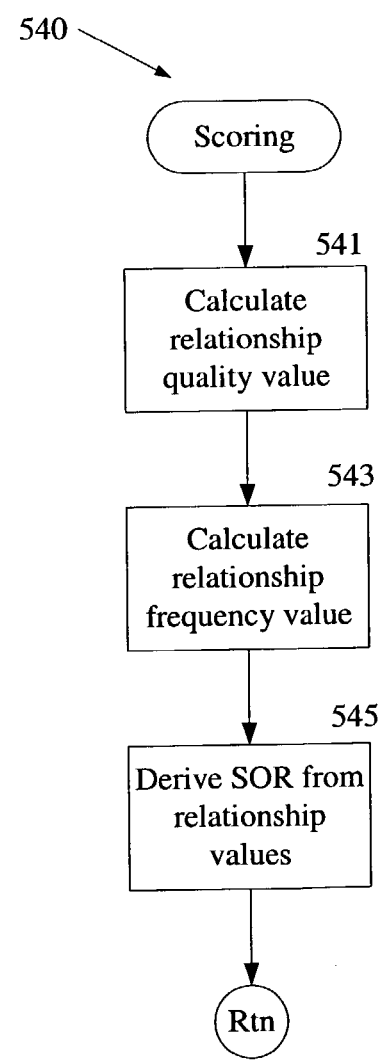

FIG. 5C illustrates one embodiment of a scoring method 540 represented by blocks 525 and 529 in FIG. 5B. A relationship quality value is calculated at block 541 and a relationship frequency value is calculated at block 543. In one embodiment, the relationship quality value is based on the information included in the subscriber's address book for the contact. For example, different values are assigned if the contact is present and the information includes the home phone number and/or the cell phone number for the contact. These values are factored together to produce a relationship quality value. The relationship frequency value is calculated based on the volume and frequency of communication between the subscriber and the contact. For example, the number of e-mails sent and received, the time and date of the e-mails, and the elapsed time since the most recent or the first e-mail was received may be factors in the relationship frequency value. At block 545, the SOR is derived from the quality value and frequency value. Additional criteria may also be factored into the SOR. In one embodiment, the processing at block 545 calculates the SOR (SOR $\leq$ 100) using the following formula $$\frac{100}{11.5}\Bigl(\frac{1.5}{3}(isContact{:}1 + haveHomeTel{:}1 + haveMobilPh{:}1) +$$
$$\frac{1.5}{3}(\min[3,\ \text{years-since-first-email}]) + \frac{1.5}{6}(\max[0,\ 6 - \text{months-since-recent-email}]) +$$
$$\frac{3}{200}(\text{sent-count}) + \frac{1.5}{200}(\text{received-count}) + \frac{0.75}{100}(\text{weekend-sent-count}) + \frac{0.75}{100}(\text{weeknight-sent-count})\Bigr)$$

where is Contact, haveHomeTel and haveMobilePh are binary values representing whether the contact is in the subscriber's electronic address book and the content of the address book entry. The other factors measure the volume, frequency, and type of email exchanged between the subscriber and the contact.

In an alternate embodiment not shown, multiple SORs may be calculated for the same relationship, such as professional SOR, a personal SOR, and/or a private SOR.

Figure 6A:
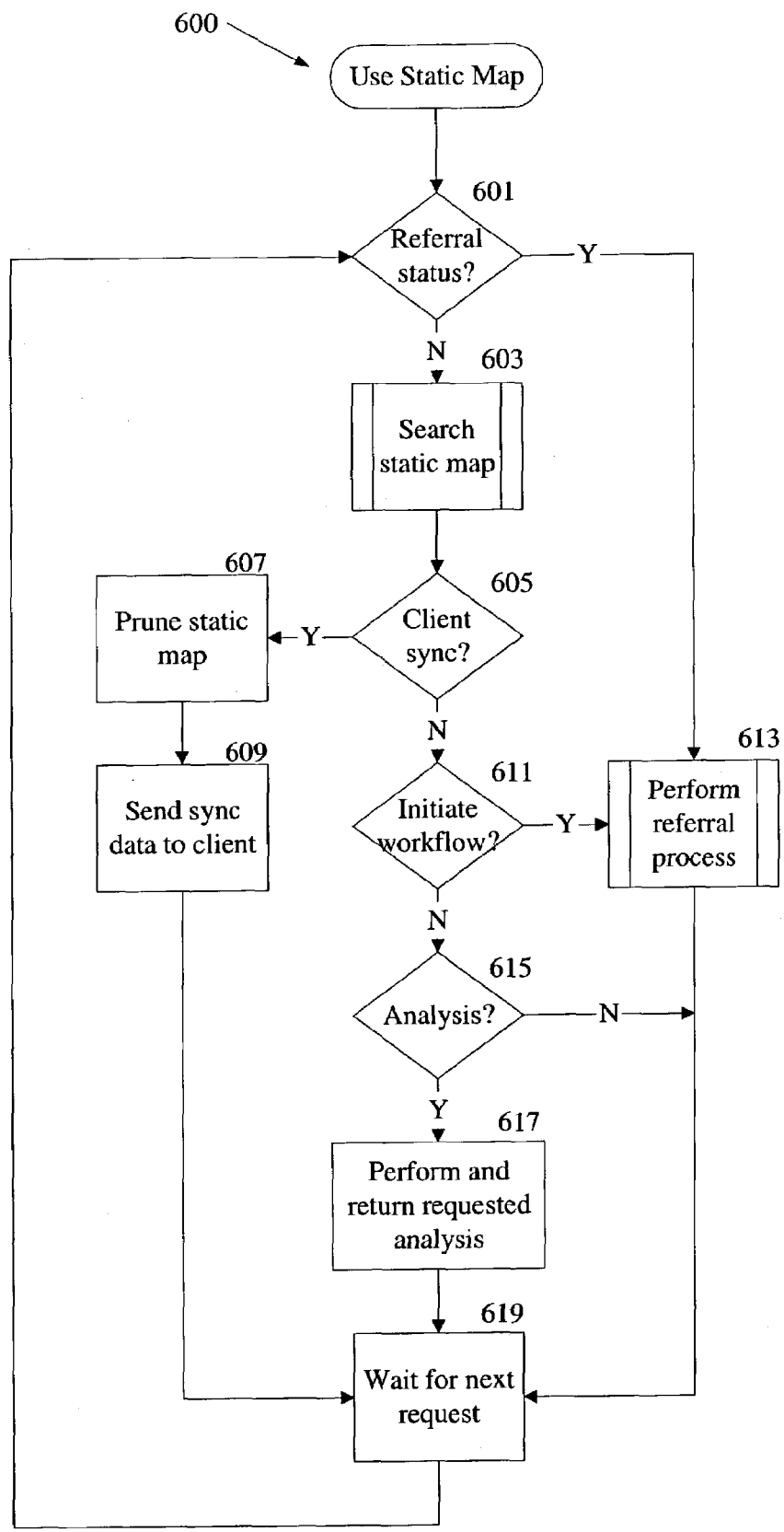
FIGS. 6A-C are flowcharts of further methods to be performed by a server according to an embodiment of the invention.
Figure 6B:
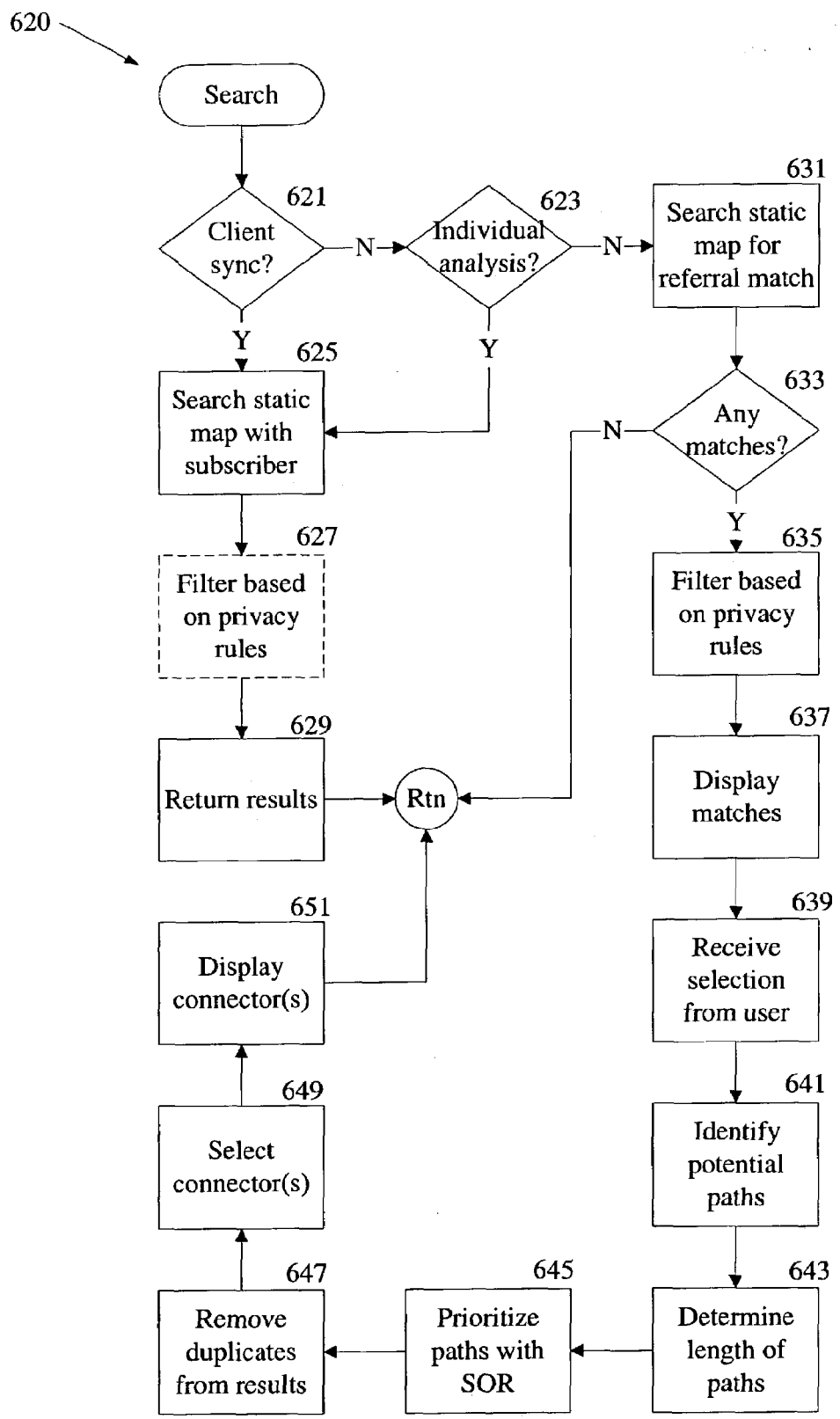
Figure 6C:
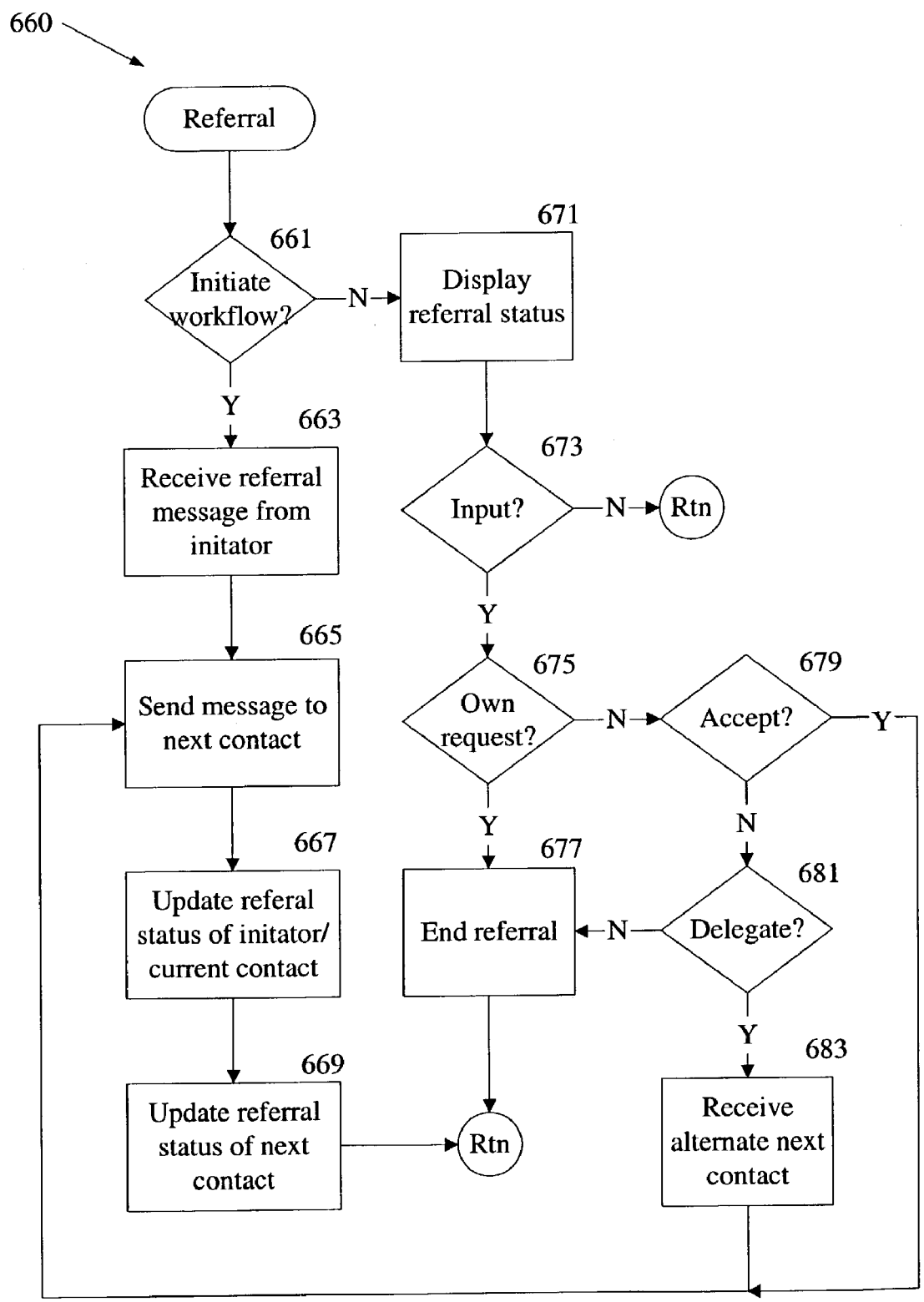

FIG. 6A illustrates a method 600 that uses a static map previously created by the relationship graph method 500. The functions of method 600 may be incorporated into the relationship engine 309 on the same server as the method 500 or on a different server. FIGS. 6B and 6C illustrate functions shown in FIG. 6A in more detail. In the embodiment shown in FIG. 6A, the method 600 processes requests for data synchronization from a client 301 and requests from on-line applications 311 of FIG. 3, such as new referrals, referral status, and analysis of relationships. If the method 600 receives a request for referral status (block 601), it performs a referral process at block 613 to display the status and process input as described further below in conjunction with FIG. 6C. Otherwise, the method 600 performs a search on the static map at block 603 and as described further below in conjunction with FIG. 6C. The type of search depends on the type of request.

If the request was for client synchronization (block 605), the search was focused on a subscriber's relationship and the results represent an ego-centric view of the relationship graph. The method 600 prunes the search results according to pre-determined criteria, and sends the resulting synchronization data to the client at block 609. The synchronization data may be subsequently searched by client applications, such as off-line applications 319 in FIG. 3.

If the requester of a new referral elects to initiate a referral workflow based on the search results (block 611), the method performs the referral process at block 613. If the request is for relationship analysis (block 615), the method 600 performs and returns the requested analysis of the search results at block 617. Various types of analysis are supported by the system and exemplary embodiments are described further below. When the current request is processed, the method 600 proceeds to block 619 to await the next request.

Turning now to FIG. 6B, one embodiment of a method 620 that searches the static map is illustrated. If the request is either for client synchronization (block 621) or analysis of an individual subscriber's relationships (block 623), the search method 620 searches the static map based on a subscriber identifier (block 625) and returns the results to the requester at block 629. The results of a search for analysis purposes may be filtered based on the privacy rules set up by the subscriber (block 627, shown in phantom) before being returned.

If a subscriber has requested the system search for a new referral, the search method 620 searches the static map for a match on referral information, and optionally other types of search criteria (block 631). Referral information may include first or last name, email, title, or any combination, to search for referral to a person, or an entity name to search for a referral within the entity, such as a company, but the invention is not so limited. In one embodiment, the search process at block 631 searches for matches through only those subscribers that have the requester in their address books. In an alternate embodiment, the search process at block 631 searches for matches through other subscribers that are in the same group as the requester as previously described.

If there are any matches in the static map (block 633), the matches are filtered based on system level privacy rules and those of the owner of the information (block 635). In one embodiment, the privacy filtering includes shadow node filtering as described previously. The filtered matches are displayed to the requester (block 637) for selection.

Upon receipt of a match selection (block 639), the search method 620 identifies potential paths between the selected match and the target of the referral (block 641). When the paths have been identified, the length of each path is determined at block 641 and each path is prioritized with its SOR value at block 645. Each path is associated with its initial match, or connector, and duplicate paths for a connector are removed from the results at block 647. The search method 620 selects one or more connectors based on a relevance value derived from the length and SOR value of the connector's path(s), and optionally other criteria, such as affiliations of the connector (e.g., alumni), that reflect the relative quality of the connector's paths to the target (block 649). The selected connectors, or a subset, are displayed to the requester in quality rank order at block 651. It will be appreciated that the subset may be a pre-determined number of connectors, or only those that satisfy a relevance value threshold, or that multiple displays may be used to show as many connectors as the requester wishes. Furthermore, one of skill in the art will readily understand how to incorporate a referral proxy feature as described above into the processing represented at block 651.

In one embodiment, three different categories of paths may be identified at block 641 depending on the search target:

paths with connectors who have the requester in their address books and also belong to a group in which the requester is a member;

paths with connectors who have the requester in their address books but are not in a group with the requester; and paths with connectors who do not have the requester in their address books, but who are reachable through the system.

Potential paths for an individual fall into the third category, while paths in all three categories may be considered when searching for a contact in a company.

In this embodiment, the relevance value for a connector is the ASOR (aggregate SOR) for first category paths, the SOR for second category paths, and the NSOR (network SOR) for third category paths. The aggregate SOR for a connector is the sum of the network SORs for all paths from the connector to the target, i.e., Σ (NSOR) with ASOR≧0. Thus, if connector A has three paths into company 1 with network SORs 35, 50 and 85 respectively, and connector B has two paths into company 1 with network SORs of 80 and 95 respectively, B is the better connector as he/she has an aggregate SOR of 175 verses A's 170. Paths with equal ASORs may be displayed to the requester along with their standard deviations.

Because people are generally less inclined to help the further they are from the requester, the network SOR includes a decay constant to factor in the attenuation of a path as follows $$\pi(SOR\_i*(1-d)^{(i-1)})$$

where d is the decay constant and NSOR≦100 (or 1.0). For example, assume an attenuation factor of d=0 and that A's path #2 to company 1 has three legs, with node-node SORs of 70, 80 and 57, so 0.7*0.8*0.57 produces 0.5, which is reported as a network SOR of 50. In contrast, assuming a non-zero attenuation factor, e.g., d=0.33, the network SOR for A's path #2 would be ((0.7*1)*(0.8*0.6688)*(0.57*(0.6688^2)))=0.0955. In one embodiment, a decay constant of 0.3312 is chosen so that the attenuation on the fifth edge is 0.2. Theoretically, referrals past four nodes are rare and attenuation factor of the fourth edge is about 0.299. It will be appreciated that different attenuation factors may be employed based on characteristics of the entities.

As mentioned above, additional criteria may be considered at block 649 to select the connectors. In one embodiment, an additional metric that represents the Likelihood of Referral or Responsiveness (LOR) of the connector may be used. LOR is derived from the history of referral requests made through this connector, including a weighting of the number of referrals accepted and denied, the total number of referral requests to this connector by anyone and specifically by the requester, the number of referrals completed to the final destination, and, for accepted referrals that did not reach the final destination, a factor of how close they got to the final destination. The LOR may be calculated as follows $$((w1*(ra/r))+(w2*(rd/r))+(w3*(ria/ri))+(w4*(rid/ri)))/w5$$

where r represents the total number of referrals from anyone, ra represents the number of referrals from anyone that are accepted, rd represents the number of referrals from anyone that are denied, ri represents the total number of referrals from the requester, ria represents the number of referrals from the requester that are accepted and rid represents the number of referrals from the requester that are denied, with w1,w2,w3, w4,w5 representing weighting values (positive or negative) that can used to tune the system. A Network LOR may also be calculated that is the weighted average of all the LORs across a path, where the weighting is based on relationship metrics, e.g. SOR.

In yet another embodiment, a Strength of Influence (SOI) represents the connector's influence on the next contact in the path. For example, in a sales situation, the SOI measures the influence of an entity on a sale from the perspective of the seller. The SOI may be calculated by polling various subscribers regarding an entity, such as through a survey initiated by applications and/or subscribers. It will be appreciated that a combination of the metrics described above may be used and that the values will be presented to the requester at block 651.

FIG. 6C illustrates one embodiment of a referral method 660 that performs a referral process represented by block 613 in FIG. 6A. If the referral method 616 is invoked by the initiation of a new referral workflow (block 661), the referral method 660 receives a selection of a connector and a referral message from the initiator, and sends the suggested next contact in the selected path and the message to the connector at block 665. The method 660 updates the referral status of the initiator and the next contact at blocks 667, 669. It will be appreciated that if the connector has multiple paths to the target, the multiple next contacts may be sent at block 665 along with a ranking, such as the associated network SORs, for the paths they represent.

Returning to block 661, if the method 660 was invoked by a request for referral status for a subscriber, it displays the referral status for the subscriber at block 671 and waits for input. If input is received (block 673), the referral method 660 determines if the subscriber has indicated an action on the subscriber's outstanding referral requests, or on a referral request from another subscriber (block 675). If the latter, the referral status displays the suggested next contact(s) in the path and the subscriber may chose to reject the referral completely, accept the suggested next contact or select one if multiple suggestions are displayed, or delegate the referral to a different person. If the action is "accepted" (block 679), the method 660 proceeds to block 665 to send the message to the next contact in the path. If the action is "delegate" (block 681), the method 660 receives an alternate next contact from the subscriber (block 683) and dynamically calculates the possible paths as described in blocks 631 through 649 in FIG. 6A. The connector(s) selected at block 649 and the message are sent to the alternate at block 665. Otherwise, the action is "reject," which ends the referral workflow at block 677. The actions taken by a subscriber on another referral request will cause the subscriber's information to be updated as described previously and further below. It will be appreciated that the referral proxy feature as described above may mask the identities of the next nodes in another subscriber's referral request.

Returning now to block 675, if the subscriber's input indicates an outstanding referral request initiated by the subscriber has been completed, or has been aborted, the method 660 ends the referral workflow at block 677. In one embodiment, different status indicators are assigned to a terminated referral workflow at block 677 that indicate which subscriber input caused it to end.

As described above in conjunction with FIG. 6B, a relevance value is generated for each connector that represents the quality of that subscriber's value with regard to a particular search. In addition, a status value may be generated that reflects the quality of the subscriber's network (as measured by connections and distance to others in the network) and on his/her frequency of use of the network. Because these are relative criteria, it is also important to measure how well a subscriber is using his (possibly limited) network in addition to how big a network he/she has. As an example, all else being equal, a subscriber who accesses 100 of the 10,000 nodes he can reach may be rated higher than a second subscriber who accesses 10 of his 10,000 nodes. A subscriber with 100,000 nodes may have a higher status value than one with 10,000. And one who uses the system with increasing frequency may have a higher status value than one who does not. Subscribers who are part of more referral networks may have a higher value than those who are not. Those who exhibit "good" behaviors, by, for example, responding to referral requests in a timely manner and engaging other subscribers, also may have higher status values than those who do not and their networks may also be more highly rated. Thus, if subscriber A chooses to reject B's referral request, not only with the status value for A be lowered, the SOR for the relationship from B to A will be reduced and the priority of future paths through A also will be downgraded. Relevant subscriber actions are fed back into the relationship graph through the processing represented by block 503 in FIG. 5A to reflect the subscriber's use of the system.

In one embodiment, the status value is a five-tuple consisting of a quality-universe value, a quality-group value, a use-universe value, a use-group value, and weighted average of the other four tuples. Each of the five values is in a range from 0-100. The quality-universe value, quality-group value, use-universe value, and use-group value are generated on a periodic basis, such as on a timed schedule or at usage thresholds, e.g., every 100 referrals. The universe values are calculated relative to the network represented by the entire relationship graph, while the group values are calculated relative to the relationship graph that represents the network for a peer group that includes the subscriber. The status value for a particular subscriber is only displayed to the subscriber and used internally in the system.

Factors for the quality-universe value include the subscriber' reachable space, average NSOR, in-degree, out-degree, number of domain names in the subscriber's email address book, and geodesic distance. In social networking theory, the in-degree value for a node measures the number of edges that terminate at the node, i.e., how many other nodes can directly reach this node. Similarly, the out-degree value for a node measures the number of edges that originate at the node, i.e., how many other nodes this node can reach directly. The geodesic distance is the number of nodes in the shortest path between two nodes.

The quality-group value is calculated as $$((SRS/GRS+SNSOR/GNSOR+SDN/GDN+SID/GID+SOD/GOD+SGD/GGD)*100)/6$$

wherein SRS represents the reachable space for the subscriber, GRS represents the average reachable space for the group, SNSOR represents the network SOR for the subscriber, GNSOR represents the average network SOR for the group, SDN represents the number of domain names in the subscriber's email address book, GDN represents the maximum number of domain names for the group, SID represents the in-degrees for the subscriber, GID represents the average in-degrees for the group, SOD represents the out-degrees for the subscriber, GID represents the average out-degrees for the group, SGD represents the geodesic distance for the subscriber's network, and GGD represents the geodesic distance for the group's network.

Factors for the use-universe value include a percentage of the subscriber's reachable space, number of searches performed, number of referrals requested, and number of referrals responded to by the subscriber.

The use-group value is calculated as $$((SS/GS+SRR/GRR+SRRT/SRRT)*100)/3$$

where SS represents the number of searches performed by the subscriber, GS represents the maximum number of searches performed by the group, SRR represents the number of referral requests made by the subscriber, GRR represents the maximum number of referral requests made by the group, SRRT represents the number of referral requests responded to by the subscriber, and GRRT represents the maximum number of referral requests responded to by the group.

The information returned at block 629 may be analyzed at block 617 using various set functions including intersection, difference, union and the set complement of the union, which may be stand-alone functions, or called from or incorporated into personal productivity and enterprise applications. The output of block 617 may be in various formats, including text, table, chart, or visualization maps, as described further below.

The personal productivity applications enable the subscriber to build, analyze, and manage his/her relationship network. For example, analysis of a subscriber's network may reveal structural holes and indicate other subscribers in the network that can fill the holes. Analysis can also identify common contacts among two people to allow each to leverage the contacts of the other. Additionally, the search and analysis represented by blocks 603 and 617 may be invoked automatically based on various triggering events. For example, information for contacts selected by criteria specified by the subscriber may be automatically sent to the subscriber on a periodic basis. A subscriber's contacts may be time-stamped and a message sent to the subscriber when analysis indicates the information has not been updated within a given time period. Information inferred for a contact, as described above, may cause a message to be sent to the subscriber and/or the contact to verify the inferred information.

The enterprise applications analyze the relationship graph globally instead of focusing on a single subscriber. For example, analysis of the contacts of team members into a target company allows the team manager to determine the strengths and weakness of the team. Conflicting and/or hidden paths into company may be identified as well. The results of the analysis may be filtered on various criteria, such as contact name, title, SOR/NSOR, or other information. Non-team based information about a target company, including parts of the organization chart, can also be derived from search results. Additionally, an enterprise application may request a search be performed at block 603 to locate all subscribers that can be connectors to one or more specific targets, with the analysis at block 617 evaluating the results on various criteria to select multiple paths into a company or to people. It will be appreciated that the referral process at block 613 may be subsequently invoked to start the workflow for the multiple paths.

In a sales environment, a set of leads for an opportunity may be fed into the search at block 603 to be correlated against the enterprise interrelationship graph to provide a lists of people that know anyone specifically identified within the opportunity and/or the company or organization identified by the opportunity. After the potential connections to opportunity identified, the analysis at block 617 qualified or disqualified or disqualifies each lead through a series of questions sent to the potential connectors. Assuming the lead is qualified, those connectors that responded may be selected as referral paths.

Furthermore, the analysis represented at block 617 may produce visual maps that represent the relationship graph or parts of it. A visual map may be ego-centric in that it focuses on a particular subscriber, either in general or in relationship to a selected target. A visual map may be socio-centric in that it shows aggregated relationships among a select group of subscribers, such as a sales team. Various views may be imposed on either type of visual map. For example, a subscriber may wish to view his/her ego-centric visual map in terms of his/her status value, and in terms of the individual relationships that are used to calculate the status value. Alternatively, a subscriber may wish to view an ego-centric visual map in terms of business verses personal relationships, which result in different views even though some of the same nodes are in both views. "Diff" visual maps may be created when a subscriber or a group of subscribers are added or deleted from the system to examine the impact that this operation has on the relationship visual map. The diff visual maps may also be used in "what-if" analysis. For example, if a sales executive is attempting to select or fire one of two potential sales reps, an individual diff visual map for each of them can provide quantifiable metrics that the sales exec can consider in arriving at his decision. All else being equal, the rep with the better reach into the target accounts is the better one to hire or retain. Another example might be the loss of a key sales rep. The sales exec is most concerned about key accounts he might lose with the departure of the particular rep. Alternatively, if the sales executive is attempting to select partners to pull into a deal can use a team diff visual map in arriving at his decision. All else being equal, the partner with the better reach into the target account is the better one. It will be appreciated that the "what-if" analysis may be manual or incorporate various mathematical programming and other optimization techniques to evaluate multiple simulations simultaneously.

Inverse "diff" visual maps can find commonality among entities, and identify hidden connectors, among other uses. Additionally, "movie" visual maps can show the growth of relationships for an individual or a group. Different levels of detail may be presented in a visual map, with an interactive ability to drill down to the different levels.

In a sales situation, a power visual map can show all known stakeholders or players at a target account and how they affect the buying decision associated with a current opportunity. The selling team uses the power visual map to understand the power dynamics of the buying organization in order to effectively penetrate the account and close the deal. At a high level, the power visual map depicts each stakeholder's preference for the vendor, their current level of involvement, and their power base. It also outlines the lines of influence, indicating who can affects other stakeholders and the outcome of an opportunity. A more detailed view of the power visual map provides information on the key pain points of each stakeholder, their role in the deal and who on the selling team is responsible for that relationship. The system will help accelerate the construction of the power visual map based on insight and information provided by people who have existing known relationships to these stakeholders. Some of these people will be on the selling team, others may not. In addition, the system will use the relationship data to infer possible lines of influence between different stakeholders at the buying organization.

Various commercially available applications that process data into visual maps are suitable for use with the invention and thus the details of such processing are not further described.

In practice, the methods described herein may constitute one or more programs made up of machine-executable instructions. Describing the method with reference to the flowcharts in FIGS. 4A-B, 5A-C and 6A-C enables one skilled in the art to develop such programs, including such instructions to carry out the operations (acts) represented by the logical blocks on suitably configured machines (the processor of the machine executing the instructions from machine-readable media). The machine-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. It will be further appreciated that more or fewer processes may be incorporated into the methods illustrated herein without departing from the scope of the invention and that no particular order is implied by the arrangement of blocks shown and described herein. Moreover, one of skill in the art will immediately recognize that the various processes described with reference to FIGS. 4A-B, 5A-C and 6A-C may be performed in a batch mode as well as in an interactive mode, or as parallel as well as in serial processes.

Figure 7A:
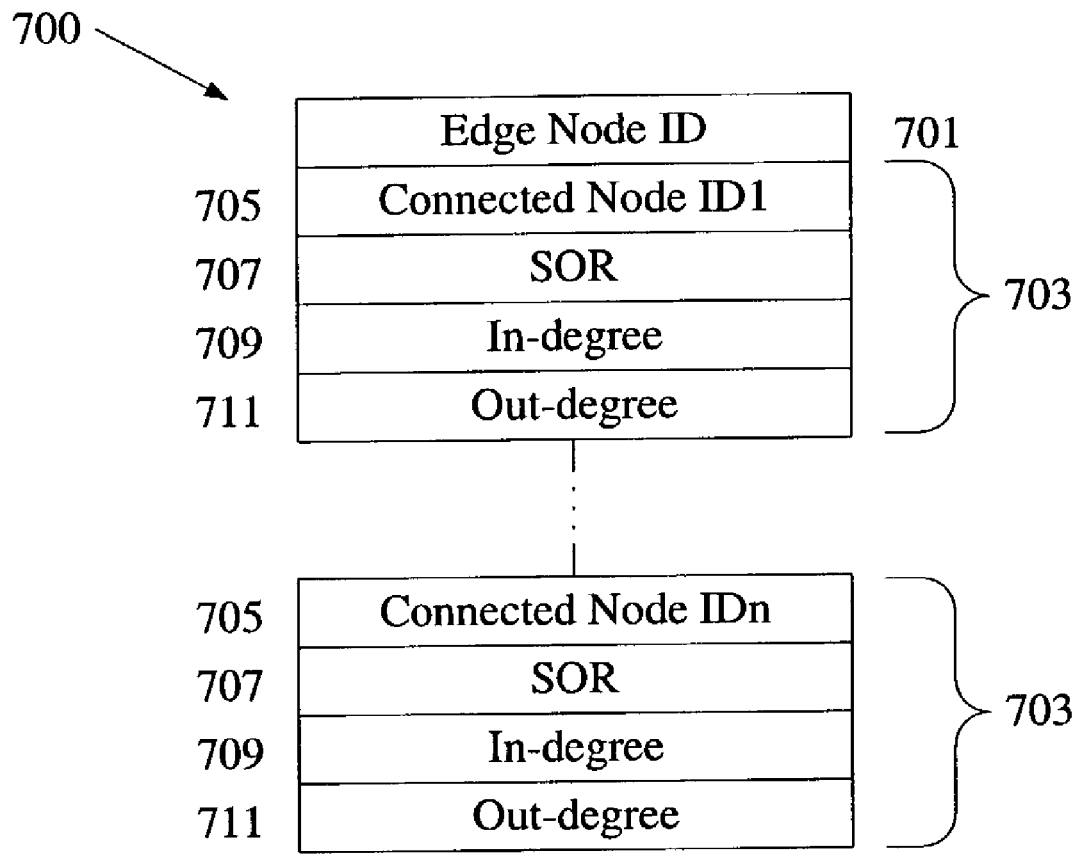
FIGS. 7A-B are diagrams of a relationship master data structure for use in an implementation of the invention.

A particular implementation of a relationship master data structure, such as relationship master 307 in FIG. 3, is now described with reference to FIGS. 7A-B. The relationship master data structure defines the characteristics of the edges and nodes in a relationship graph. The data structure for edges between pairs of nodes is illustrated in FIG. 7A. The edge data structure 700 defines each edge using an edge node identifier field 701 and one or more connected node entries 703. The edge node identifier field 701 identifies an instant node from which the edges represented by the connected node entries 703 originate or terminate. Each node entry 703 consists of a connected node identifier 705, at least one SOR value 707 for the edge, an in-degree field 709 that represents the in-degree distance from the connected node to the instant node and an out-degree field 711 that represents the out-degree distance from the instant node to the connected node.

Figure 7B:
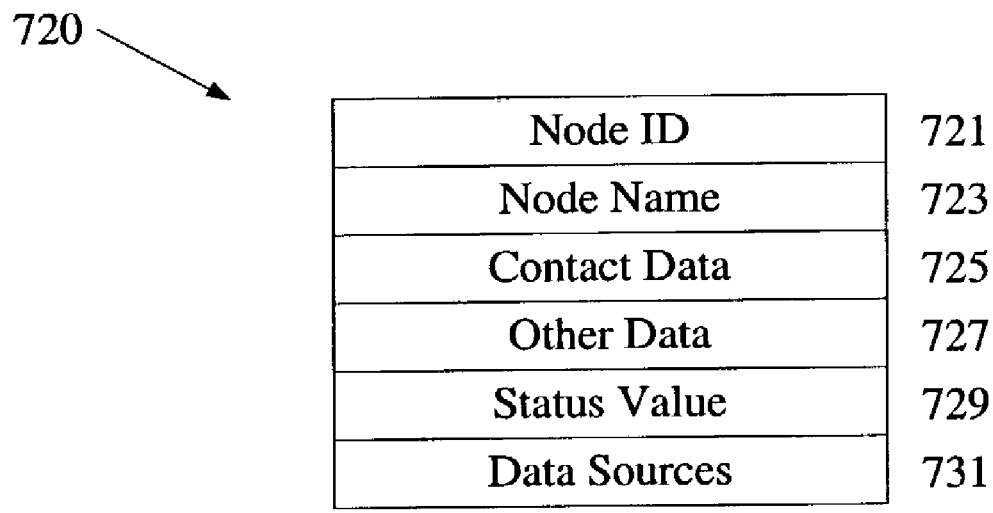

The identifiers 701, 705 reference a corresponding node that is defined by a node data structure 720 shown in FIG. 7B. The node data structure 702 consists of a node identifier 721, node name 723, node contact data 725, other data for the node 727, status value for the node 729, and data sources 731 for the information in the node data structure 702. The node contact data 725 may include email address(es), street addresses, and telephone numbers. The other data 727 may include personal and family data, such as birth date, spouse, name, etc., personal interests, entity affiliations, such as schools attended and association memberships, jobs held, and/or LOR and SOI values. In one embodiment, business information may be stored separately from the node data structure and referenced by identifiers for the data being stored in the node data structure to allow multiple nodes to share the same business information without having to replicate the data multiple times.

It will be appreciated that additional information may be included in the relationship master data structure. For example, the edge data structure may also include fields that contain the raw data from which the SOR is calculated. Additional fields may be included to represent. Additionally, fields in the relationship master data structure may contain attributes for the data contained in the field, such as a privacy or origin indicator, may be fixed or variable length, and may be required or optional. Thus, alternate embodiments that include more or fewer data fields are contemplated as within the scope of the invention.

Figure 8A:
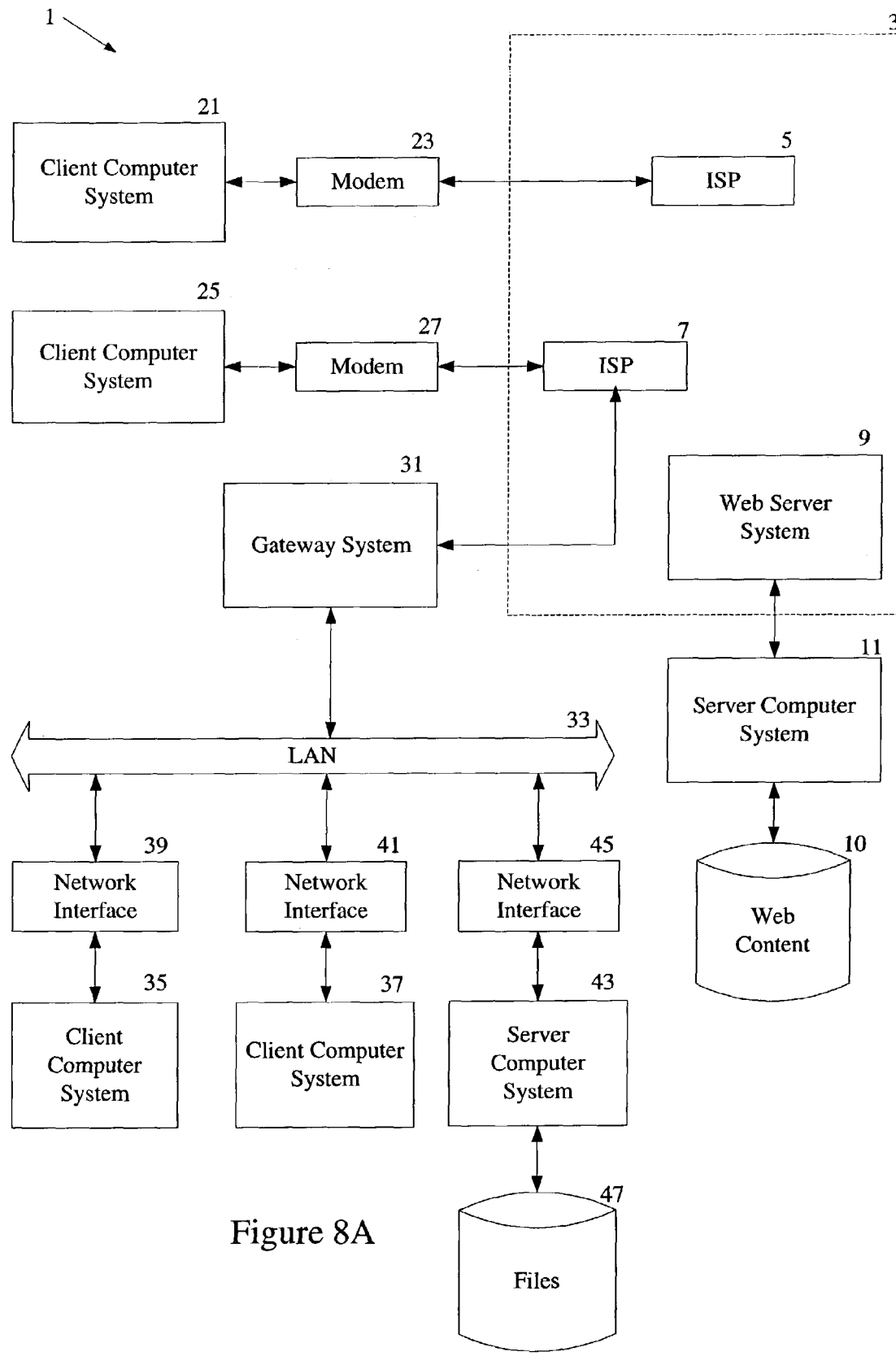
FIG. 8A is a diagram of one embodiment of an operating environment suitable for practicing the present invention.
Figure 8B:
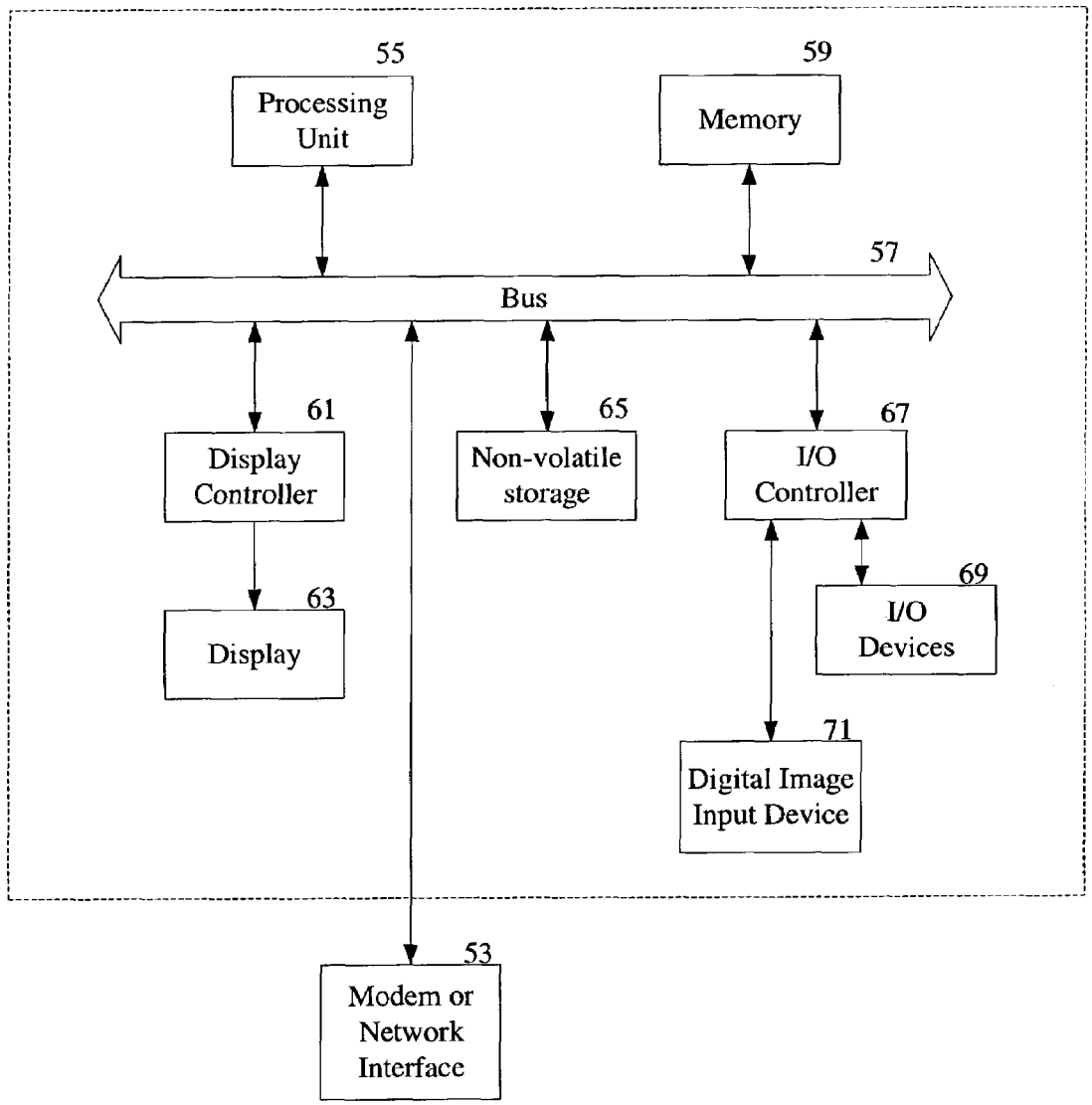
FIG. 8B is a diagram of one embodiment of a computer system suitable for use in the operating environment of FIG. 8A.

The following description of FIGS. 8A-B is intended to provide an overview of computer hardware and other operating components suitable for performing the methods of the invention described above, but is not intended to limit the applicable environments. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 8A shows several computer systems 1 that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 8A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, a network computer, a Web TV system, a handheld device, or other such computer system. Similarly, the ISP 7 provides Internet connectivity for client systems 25, 35, and 37, although as shown in FIG. 8A, the connections are not the same for these three computer systems. Client computer system 25 is coupled through a modem interface 27 while client computer systems 35 and 37 are part of a LAN. While FIG. 8A shows the interfaces 23 and 27 as generically as a "modem," it will be appreciated that each of these interfaces can be an analog modem, ISDN modem, cable modem, satellite transmission interface, or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system.

Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 8B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface, or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display (LCD). The input/output devices 69 can include a keyboard, disk drives, printers, a scanner, and other input and output devices, including a mouse or other pointing device. The display controller 61 and the I/O controller 67 can be implemented with conventional well known technology. A digital image input device 71 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the terms "computer-readable medium" and "machine-readable medium" include any type of storage device that is accessible by the processor 55 and also encompass a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 the memory 59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 8B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 65 and causes the processor 55 to execute the various acts required by the operating system to input and output data and to store data in memory, including storing files on the non-volatile storage 65.

An entity relationship analysis and mapping system has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that although the system has been described in terms of sales prospecting and lead generation, the invention is not so limited and is suitable for use in any environment that utilizes referrals from one person to another. Furthermore, those of ordinary skill within the art will appreciate the term "database" has been used in its generic sense and is intended to encompasses all types of logical data storage, including relational, hierarchical, indexed and flat file systems. Therefore, it is manifestly intended that this invention be limited only by the following

What is claimed is:

1. A computerized method of searching a relationship graph having nodes representing entities and edges representing relationships between entities, the method comprising:
    searching the relationship graph for one or more entities matching a search criteria specified by a requestor;
    identifying a plurality of potential paths through the relationship graph to a single matching entity, each of the potential paths including a plurality of nodes and a plurality of edges connecting the plurality of nodes;
    for each of the plurality of potential paths, specifying a node in the potential path as a connector for the potential path;
    removing duplicate paths from the plurality of potential paths, wherein a potential path is a duplicate path if it shares the connector with another path;
    calculating a quality of contact between each pair of directly connected nodes in the plurality of potential paths, the quality of contact varying between different pairs of directly connected nodes, wherein the quality of contact is calculated automatically based on a first set of data without requiring a user to input data that corresponds to a quality of contact value;
    calculating a frequency of contact between each pair of directly connected nodes in the plurality of potential paths based on a second set of data;
    calculating a strength of relationship weight for each of the edges in the plurality of potential paths, the strength of relationship weight depending on the quality of contact and the frequency of contact;
    calculating a relevance value for, and associating the relevance value to, each of the plurality of potential paths to the single matching entity, the relevance value being based upon a length of the potential path and the strength of relationship weights associated with the edges in the potential path, the relevance value being further based on at least one of a likelihood of responsiveness and a strength of influence; and
    selecting a path to the single matching entity from the plurality of potential paths to the single matching entity based upon the calculated relevance values.

2. The computerized method of claim 1, wherein the connector is a first node in the path.

3. The computerized method of claim 1 further comprising:
    filtering matches according to subscriber privacy rules and system level privacy rules.

4. The computerized method of claim 1 further comprising:
    selecting a subset of the plurality of potential paths based on a threshold.

5. The computerized method of claim 4, wherein the threshold is selected from the group consisting of a particular relevance value and a number of paths.

6. The computerized method of claim 1 further comprising:
    displaying the connector and the relevance value for the path.

7. The computerized method of claim 1 further comprising:
    masking an identity of the entity associated with the connector.

8. The computerized method of claim 1 further comprising:
    displaying multiple matches; and
    receiving a selection of one of the matches.

9. The computerized method of claim 1, further comprising:
    displaying the plurality of potential paths in a quality rank order.

10. The computerized method of claim 1, wherein the potential paths include at least three different path types, the three different path types comprising:
    a first path type that includes connectors associated with entities that have an entry in an address book that corresponds to an entity that initiated the search and that belong to a group of which the entity that initiated the search is a member;
    a second path type that includes connectors associated with entities that have an entry in an address book that corresponds to the entity that initiated the search and that do not belong to a group of which the entity that initiated the search is a member; and
    a third path type that includes connectors associated with entities that do not have an entry in an address book that corresponds to the entity that initiated the search.

11. The computerized method of claim 1, wherein for each of the plurality of potential paths an attenuation factor is applied to at least a portion of the strength of relationship weights based on the length of the potential path.

12. An article of manufacture comprising a nonvolatile storage having stored thereon executable instructions to cause a machine to perform a method comprising:
    searching a relationship graph having nodes representing entities and edges representing relationships between entities for one or more entities matching a search criteria specified by a requestor;
    identifying a plurality of potential paths through the relationship graph to a single matching entity, each of the potential paths including a plurality of nodes and a plurality of edges connecting the plurality of nodes;
    for each of the plurality of potential paths, specifying a node in the potential path as a connector for the potential path;

removing duplicate paths from the plurality of potential paths, wherein a potential path is a duplicate path if it shares the connector with another path;

calculating a quality of contact between each pair of directly connected nodes in the plurality of potential paths, the quality of contact varying between different pairs of directly connected nodes, wherein the quality of contact is calculated automatically based on a first set of data without requiring a user to input data that corresponds to a quality of contact value;

calculating a frequency of contact between each pair of directly connected nodes in the plurality of potential paths based on a second set of data;

calculating a strength of relationship weight for each of the edges in the plurality of potential paths, the strength of relationship weight depending on the quality of contact and the frequency of contact;

calculating a relevance value for, and associating the relevance value to, each of the plurality of potential paths to the single matching entity, the relevance value being based upon a length of the potential path and the strength of relationship weights associated with the edges in the potential path, the relevance value being further based on at least one of a likelihood of responsiveness and a strength of influence; and selecting a path to the single matching entity from the plurality of potential paths to the single matching entity based upon the calculated relevance values.

13. The article of manufacture of claim 12, wherein the connector is a first node in the path.

14. The article of manufacture of claim 12, wherein the method further comprises:
filtering matches according to subscriber privacy rules and system level privacy rules.

15. The article of manufacture of claim 12, wherein the method further comprises:
selecting a subset of the plurality of potential paths based on a threshold.

16. The article of manufacture of claim 15, wherein the threshold is selected from the group consisting of a particular relevance value and a number of paths.

17. The article of manufacture of claim 12, wherein the method further comprises:
displaying the connector and the relevance value for the path.

18. The article of manufacture of claim 12, wherein the method further comprises:
masking an identity of the entity associated with the connector.

19. The article of manufacture of claim 12, wherein the method further comprises:
displaying multiple matches; and
receiving a selection of one of the matches.

20. The article of manufacture of claim 12, the method further comprising:
displaying the plurality of potential paths in a quality rank order.

21. The article of manufacture of claim 12, wherein the potential paths include at least three different path types, the three different path types comprising:
a first path type that includes connectors associated with entities that have an entry in an address book that corresponds to an entity that initiated the search and that belong to a group of which the entity that initiated the search is a member;
a second path type that includes connectors associated with entities that have an entry in an address book that corresponds to the entity that initiated the search and that do not belong to a group of which the entity that initiated the search is a member; and
a third path type that includes connectors associated with entities that do not have an entry in an address book that corresponds to the entity that initiated the search.

22. The article of manufacture of claim 12, wherein for each of the plurality of potential paths an attenuation factor is applied to at least a portion of the strength of relationship weights based on the length of the potential path.

23. A system comprising:
a processor coupled to a memory through a bus and further coupled to an I/O interface; and
a search process executed from the memory by the processor to cause the processor to search a relationship graph having nodes representing entities and edges representing relationships between entities for one or more entities matching a search criteria specified by a requestor, identify a plurality of potential paths through the relationship graph to a single matching entity, each of the potential paths including a plurality of nodes and a plurality of edges connecting the plurality of nodes, specify a node in the potential path as a connector for the path for each of the plurality of potential paths, remove duplicate paths from the plurality of potential paths, wherein a potential path is a duplicate path if it shares the connector with another path, calculate a quality of contact between each pair of directly connected nodes in the plurality of potential paths, the quality of contact varying between different pairs of directly connected nodes, wherein the quality of contact is calculated automatically based on a first set of data without requiring a user to input data that corresponds to a quality of contact value, calculate a frequency of contact between each pair of directly connected nodes in the plurality of potential paths based on a second set of data, calculate a strength of relationship weight associated with edges in the potential path, the strength of relationship weight depending on the quality of contact and the frequency of contact, calculate a relevance value for, and associate the relevance value to, each of the plurality of potential paths to the single matching entity, the relevance value being based upon a length of the potential path and the strength of relationship weight associated with the edges in the potential path, the relevance value being further based on at least one of a likelihood of responsiveness and a strength of influence, and select a path to the single matching entity from the plurality of potential paths to the single matching entity based upon the calculated relevance values.

24. The system of claim 23, wherein the connector is a first node in the path, and wherein a potential path is a duplicate path if it shares the connector with another potential path.

25. The system of claim 23, wherein the search process further causes the processor to filter matches according to subscriber privacy rules and system level privacy rules.

26. The system of claim 23, wherein the search process further causes the processor to select a subset of the plurality of potential paths based on a threshold.

27. The system of claim 26, wherein the threshold is selected from the group consisting of a particular relevance value and a number of paths.

28. The system of claim 23, wherein the search process further causes the processor to display the connector and the relevance value for the path through the I/O interface.

29. The system of claim 23, wherein the search process further causes the processor to mask an identity of the entity associated with the connector.

30. The system of claim 23, wherein the search process further causes the processor to display multiple matches and receive a selection of one of the matches through the I/O interface.

* * * * *